United States Patent
Tokunaga et al.

(10) Patent No.: US 10,704,417 B2
(45) Date of Patent: Jul. 7, 2020

(54) SLIDING COMPONENT HAVING FLUID INTRODUCTION GROOVE AND DYNAMIC PRESSURE GENERATION GROOVE

(71) Applicant: EAGLE INDUSTRY CO., LTD., Minato-ku, Tokyo (JP)

(72) Inventors: Yuichiro Tokunaga, Tokyo (JP); Keiichi Chiba, Tokyo (JP); Masatoshi Itadani, Tokyo (JP); Hikaru Katori, Tokyo (JP); Wataru Kimura, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 276 days.

(21) Appl. No.: 15/565,664

(22) PCT Filed: Apr. 13, 2016

(86) PCT No.: PCT/JP2016/061854
§ 371 (c)(1),
(2) Date: Oct. 10, 2017

(87) PCT Pub. No.: WO2016/167262
PCT Pub. Date: Oct. 20, 2016

(65) Prior Publication Data
US 2018/0073394 A1    Mar. 15, 2018

(30) Foreign Application Priority Data
Apr. 15, 2015   (JP) .................................. 2015-082917

(51) Int. Cl.
*F01D 25/16* (2006.01)
*F02C 7/06* (2006.01)
(Continued)

(52) U.S. Cl.
CPC .............. *F01D 25/16* (2013.01); *F02B 39/00* (2013.01); *F02C 7/06* (2013.01); *F02C 7/28* (2013.01); *F16J 15/34* (2013.01); *F01D 25/183* (2013.01)

(58) Field of Classification Search
CPC ...... F16J 15/34; F16J 15/3412; F01D 25/183; F01D 25/16
See application file for complete search history.

(56) References Cited

U.S. PATENT DOCUMENTS 5,368,314 A * 11/1994 Victor .................. F16J 15/3412
                                                          277/400
5,496,047 A * 3/1996 Goldswain ........... F16J 15/3412
                                                          277/400
(Continued)

FOREIGN PATENT DOCUMENTS

JP          S6231775 A      2/1987
JP          S62117360 U     7/1987
(Continued)

OTHER PUBLICATIONS

International Search Report (ISR) dated Jun. 14, 2016, issued for International application No. PCT/JP2016/061854.

*Primary Examiner* — Woody A Lee, Jr.
(74) *Attorney, Agent, or Firm* — Law Office of Katsuhiro Arai

(57) ABSTRACT

Both conflicting functions of sealing and lubrication of sliding faces are made compatible over an entire period from the time of startup through the time of steady operation. A pair of sliding parts that relatively slide on each other is provided, one of the sliding parts being a stationary-side seal ring, the other of the sliding parts being a rotating-side seal ring, the seal rings each having a sliding face S formed radially for sealing sealed fluid from leaking, at least one of the sliding faces S being provided with fluid introduction (Continued)

grooves 10 configured to communicate with a first peripheral edge of the sliding face S and not to communicate with a second peripheral edge, and being provided with dynamic pressure generation grooves configured to communicate with the second peripheral edge of the sliding face S and not to communicate with the first peripheral edge.

18 Claims, 11 Drawing Sheets

(51) Int. Cl.
    *F02C 7/28*          (2006.01)
    *F16J 15/34*        (2006.01)
    *F02B 39/00*        (2006.01)
    *F01D 25/18*        (2006.01)

(56) References Cited

U.S. PATENT DOCUMENTS

| | | | |
|---|---|---|---|
| 7,258,346 B2* | 8/2007 | Tejima | F16J 15/3412 |
| | | | 277/399 |
| 2015/0184752 A1* | 7/2015 | Itadani | F16J 15/3412 |
| | | | 277/400 |

FOREIGN PATENT DOCUMENTS

| | | |
|---|---|---|
| JP | H08159295 A | 6/1996 |
| JP | H0989119 A | 3/1997 |
| JP | H10281299 A | 10/1998 |
| JP | 2001012610 A | 1/2001 |
| JP | 2010216587 A | 9/2010 |
| JP | WO2014103631 A1 | 7/2014 |

* cited by examiner

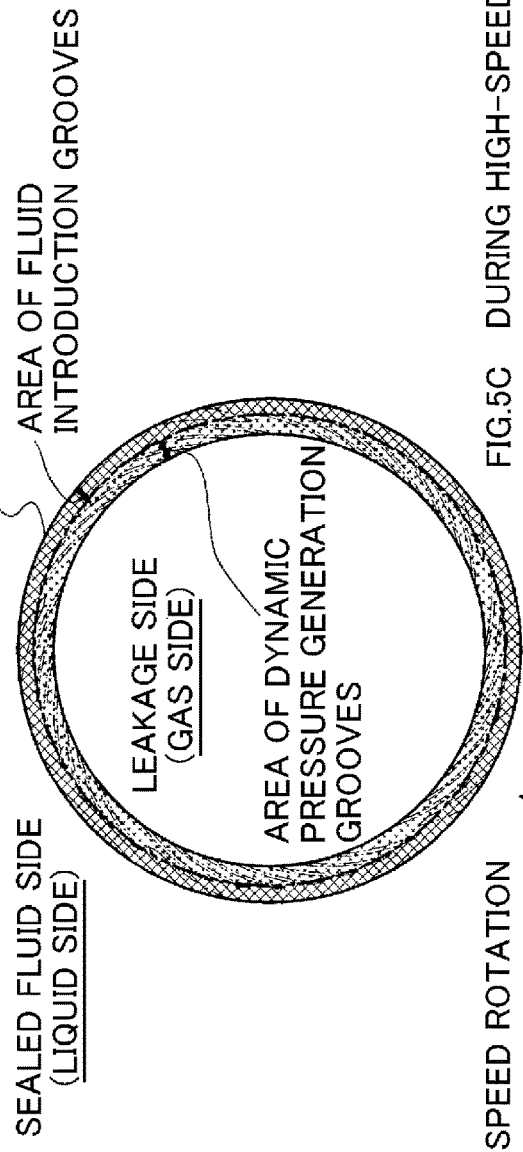
FIG.5A  BASIC CONFIGURATION
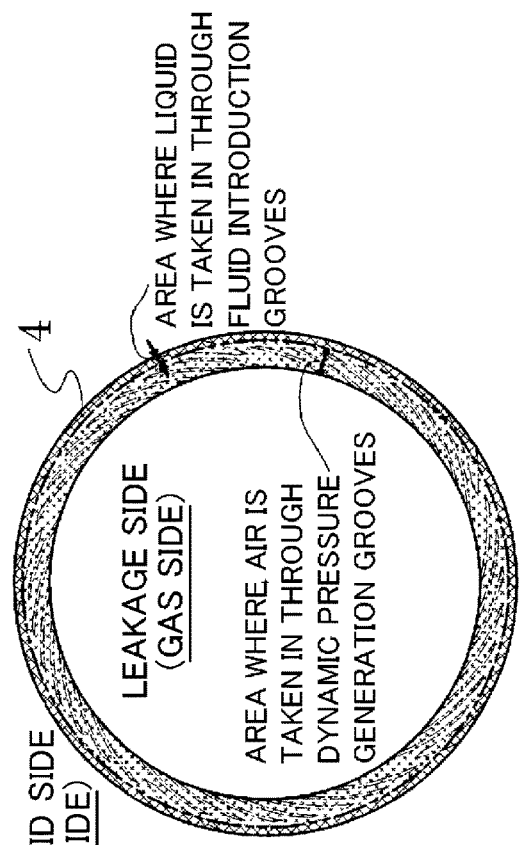
FIG.5C  DURING HIGH-SPEED ROTATION
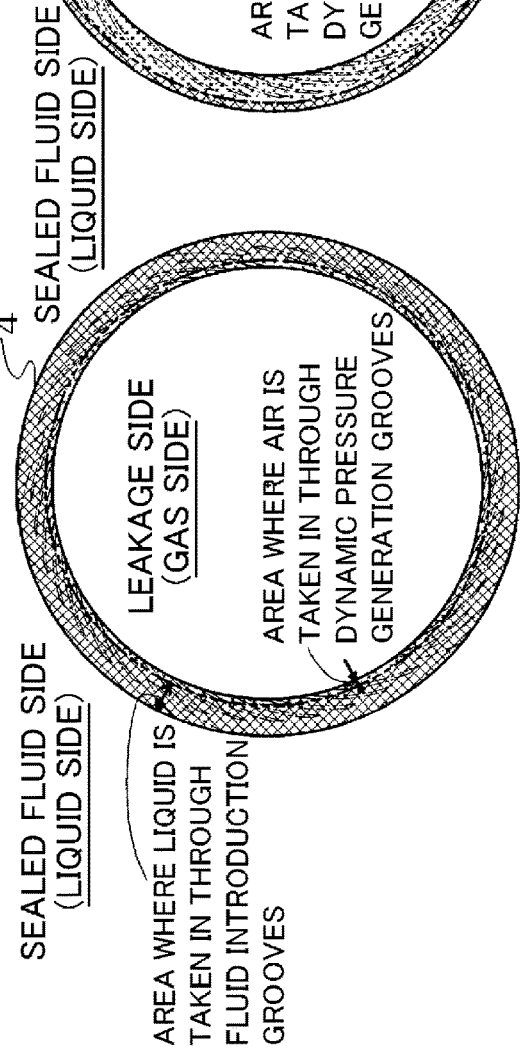
FIG.5B  DURING LOW-SPEED ROTATION

SLIDING COMPONENT HAVING FLUID INTRODUCTION GROOVE AND DYNAMIC PRESSURE GENERATION GROOVE

This application is the U.S. National Phase under 35 U.S.C. § 371 of International Application PCT/JP2016/061854, filed Apr. 13, 2016, which claims priority to Japanese Patent Application No. 2015-082917, filed Apr. 15, 2015. The International Application was published under PCT Article 21(2) in a language other than English.

TECHNICAL FIELD

The present invention relates to sliding components suitable for, for example, mechanical seals, bearings, and other sliding units. In particular, the present invention relates to sliding components such as seal rings required to reduce friction by interposing fluid between sliding faces and prevent the leakage of fluid from the sliding faces, e.g., oil seals used in gearboxes for turbochargers or for aircraft engines, or bearings.

BACKGROUND ART

A mechanical seal, an example of a sliding component, is evaluated in its performance by a leakage rate, a wear rate, and torque. In conventional techniques, by optimizing the seal materials and the sliding face roughness of mechanical seals, the performance is increased to achieve low leakage, long life, and low torque. However, due to growing awareness of environmental problems in recent years, a further improvement in the performance of mechanical seals has been demanded, and technology development beyond the limits of the conventional techniques has been required.

Under such circumstances, as one used in an oil seal device for a rotating component such as a turbocharger, for example, a known one includes a rotating shaft rotatably placed in a housing, a disk-shaped rotor rotating with the rotating shaft, and a disk-shaped stationary body that is fixed to the housing and abuts on an end face of the rotor to prevent the leakage of oil from the outer peripheral side to the inner peripheral side, the stationary body having an abutment surface provided with an annular groove that generates positive pressure by the centrifugal force of fluid, to prevent the leakage of oil from the outer peripheral side to the inner peripheral side (see Patent Document 1, for example).

Another known one in a rotating shaft seal device for sealing toxic fluid, for example, includes a rotating ring with a rotating shaft and a stationary ring mounted to a casing, one of the rotating ring and the stationary ring having a sliding face provided with a spiral groove for drawing liquid on the low-pressure side toward the high-pressure side by the rotation of the rotating ring, with an end on the high-pressure side being in a dead-end shape, to prevent the leakage of sealed fluid on the high-pressure side to the low-pressure side (see Patent Document 2, for example).

Another known one, as a face seal structure suitable for sealing a drive shaft of a turbocharger against a compressor housing, for example, has one of a pair of seal rings working together provided as a rotating component, and the other provided as a stationary component, the seal rings each having a sliding face formed substantially radially, and forming, between the sliding faces, a seal gap for sealing an area provided outward of the sliding faces against an area provided inward of the sliding faces during operation, at least one of the sliding faces being provided with a plurality of circumferentially spaced recessed portions effective for feeding gas, the recessed portions extending from one peripheral edge of the sliding face toward the other peripheral edge, inner ends of the recessed portions being radially spaced from the other peripheral edge of the sliding face, to seal a non-gas component in a gas medium containing the non-gas component (see Patent Document 3, for example).

CITATION LIST

Patent Document

Patent Document 1: JP 62-117360 U
Patent Document 2: JP 62-31775 A
Patent Document 3: JP 2001-12610 A

SUMMARY OF THE INVENTION

Problem to be Solved by the Invention

However, in the conventional techniques described in Patent Documents 1 to 3 described above, some circumferential velocity is required for sliding faces of a pair of sliding parts sliding relatively to float and be brought into a gas lubrication state, and there is a problem that the sliding faces are worn and damaged under boundary lubrication condition before they float.

The present invention has an object of providing a sliding component capable of making both conflicting functions of sealing and lubrication of sliding faces compatible over an entire period from the time of startup through the time of steady operation by actively introducing fluid (e.g. liquid) from one side of sliding faces of a pair of sliding parts sliding relatively at the time of startup before the sliding faces float to improve lubricity, and discharging fluid (e.g. liquid) from the sliding faces and introducing fluid (e.g. gas) from the other side of the sliding faces during steady operation to bring them into a fluid (gas) lubrication state.

Means for Solving Problem

To attain the above object, a sliding component according to a first aspect of the present invention includes a pair of sliding parts that relatively slide on each other, one of the sliding parts being a stationary-side seal ring, the other of the sliding parts being a rotating-side seal ring, the seal rings each having a sliding face formed radially for sealing sealed fluid from leaking, at least one of the sliding faces being provided with a fluid introduction groove configured to communicate with a first peripheral edge of the sliding face and not to communicate with a second peripheral edge of the sliding face, and being provided with a dynamic pressure generation groove configured to communicate with the second peripheral edge of the sliding face and not to communicate with the first peripheral edge of the sliding face.

According to this aspect, by providing the fluid introduction groove configured to communicate with the first peripheral edge of the sliding face and not to communicate with the second peripheral edge of the sliding face, fluid present on a first side of the sliding face can be actively introduced into the sliding face in a low-speed rotation state of the rotating-side seal ring such as at the time of startup, to lubricate the sliding face. Fluid introduced into the sliding face through the fluid introduction groove is discharged by centrifugal force during high-speed rotation of the rotating-side seal ring such as in steady operation, so that the fluid does not leak to the inner peripheral side, the leakage side.

Further, by providing the dynamic pressure generation groove configured to communicate with the second peripheral edge of the sliding face and not to communicate with the first peripheral edge of the sliding face, in a high-speed rotation state of the rotating-side seal ring such as in steady operation, fluid present on a second side of the sliding face is sucked, generating dynamic pressure (positive pressure), so that a slight gap is formed between the sliding faces of the rotating-side seal ring and the stationary-side seal ring, and the sliding faces can be brought into a state of fluid lubrication and very low friction. At the same time, fluid present on the second side is pumped through the dynamic pressure generation groove toward the first side, and thus can prevent fluid on the first side from leaking to the second side.

According to a second aspect of the present invention, a sliding component includes a pair of sliding parts that relatively slide on each other, one of the sliding parts being a stationary-side seal ring, the other of the sliding parts being a rotating-side seal ring, the seal rings each having a sliding face formed radially for sealing liquid or misty fluid which is sealed fluid from leaking, at least one of the sliding faces being provided with a fluid introduction groove configured to communicate with a peripheral edge of the sliding face on a sealed fluid side and not to communicate with a peripheral edge of the sliding face on a leakage side, and being provided with a dynamic pressure generation groove configured to communicate with the peripheral edge of the sliding face on the leakage side and not to communicate with the peripheral edge of the sliding face on the sealed fluid side.

According to this aspect, by providing the fluid introduction groove configured to communicate with the sealed fluid side of the sliding face and not to communicate with the leakage side, liquid or misty fluid present on the sealed fluid side of the sliding face can be actively introduced into the sliding face in a low-speed rotation state of the rotating-side seal ring such as at the time of startup, to lubricate the sliding face.

Liquid or misty fluid introduced into the sliding face through the fluid introduction groove is discharged by centrifugal force during high-speed rotation of the rotating-side seal ring such as in steady operation, so that the liquid or misty fluid does not leak to the inner peripheral side, the leakage side.

Further, by providing the dynamic pressure generation groove configured to communicate with the peripheral edge of the sliding face on the leakage side and not to communicate with the peripheral edge of the sliding face on the sealed fluid side, in a high-speed rotation state of the rotating-side seal ring such as in steady operation, fluid is sucked from the leakage side, generating dynamic pressure (positive pressure), so that a slight gap is formed between the sliding faces of the rotating-side seal ring and the stationary-side seal ring, and the sliding faces can be brought into a state of fluid lubrication and very low friction. At the same time, fluid on the leakage side is pumped through the dynamic pressure generation groove toward the sealed fluid side, and thus can prevent liquid or misty fluid on the sealed fluid side from leaking to the leakage side.

According to a third aspect of the present invention, in the sliding component in the first or second aspect, the fluid introduction groove and the dynamic pressure generation groove are provided only in the sliding face of the rotating-side seal ring.

According to this aspect, fluid introduced into the sliding face through the fluid introduction groove is discharged by centrifugal force during high-speed rotation of the rotating-side seal ring such as in steady operation, so that liquid or misty fluid does not leak to the inner peripheral side, the leakage side.

Further, in the high-speed rotation state of the rotating-side seal ring such as in steady operation, fluid is sucked more from the leakage side, generating dynamic pressure (positive pressure), so that a slight gap is formed between the sliding faces of the rotating-side seal ring and the stationary-side seal ring, and the sliding faces can be brought into a state of fluid lubrication and very low friction.

Further, a combination of the material of the rotating-side seal ring being silicon carbide (SiC) and the material of the stationary-side seal ring being carbon is possible, which can prevent damage to the sliding faces if the sliding faces become dry.

According to a fourth aspect of the present invention, in the sliding component in the first or second aspect, the fluid introduction groove and the dynamic pressure generation groove are provided only in the sliding face of the stationary-side seal ring.

According to this aspect, fluid present on the first side of the sliding face can be more actively introduced into the sliding face in the low-speed rotation state of the rotating-side seal ring opposite such as at the time of startup, to lubricate the sliding face.

According to a fifth aspect of the present invention, in the sliding component in the first or second aspect, the fluid introduction groove is provided in the sliding face of one of the rotating-side seal ring and the stationary-side seal ring, and the dynamic pressure generation groove is provided in the sliding face of the other of the rotating-side seal ring and the stationary-side seal ring.

According to this aspect, processing to form the fluid introduction groove and the dynamic pressure generation groove can be easily performed.

According to a sixth aspect of the present invention, in the sliding component in any one of the first to fifth aspects, the fluid introduction groove is provided on a first radial side of the sliding face, the dynamic pressure generation groove is provided on a second radial side of the sliding face, and a degassing groove is provided between the fluid introduction groove and the dynamic pressure generation groove.

According to this aspect, fluid sucked from the first side can be prevented from being mixed into fluid on the second side and destabilizing dynamic pressure generation, so that dynamic pressure generation can be stabilized.

Further, fluid on the first side can be prevented from leaking to the second side.

According to a seventh aspect of the present invention, in the sliding component in any one of the first to sixth aspects, the fluid introduction groove is provided along the first peripheral edge of the sliding face, has an opening that is open only to the first peripheral edge of the sliding face, and is formed in a tapered shape largest at the opening.

According to this aspect, fluid present on the first side of the sliding face can easily enter the sliding face in the low-speed rotation state of the rotating-side seal ring such as at the time of startup, contributing to the lubrication of the sliding face.

According to an eighth aspect of the present invention, in the sliding component in any one of the first to sixth aspects, the fluid introduction groove is provided along the first peripheral edge of the sliding face, has an opening that is open only to the first peripheral edge of the sliding face, and is formed in a shape radially cut in an arc shape at a side opposite to the opening.

According to this aspect, fluid can be introduced into the sliding face in either rotational direction of the rotating-side seal ring.

According to a ninth aspect of the present invention, in the sliding component in any one of the first to sixth aspects, the fluid introduction groove is provided along the first peripheral edge of the sliding face, and includes a fluid introduction portion and a fluid discharge portion that communicate only with the first peripheral edge of the sliding face, and a fluid communication portion that circumferentially connects the fluid introduction portion and the fluid discharge portion.

According to this aspect, fluid present on the first side of the sliding face can be more actively introduced into the sliding face in the low-speed rotation state of the rotating-side seal ring such as at the time of startup, to lubricate the sliding face.

According to a tenth aspect of the present invention, in the sliding component in any one of the first to ninth aspects, a positive pressure generation mechanism with a positive pressure generation groove that communicates, at an upstream end, with the fluid introduction groove is provided.

According to this aspect, positive pressure (dynamic pressure) is generated even in the low-speed rotation state of the rotating-side seal ring such as at the time of startup, in particular, so that a liquid film on the sliding faces at low speeds is increased, and lubrication performance at low speeds can be improved.

According to an eleventh aspect of the present invention, in the sliding component in any one of the first to tenth aspects, the dynamic pressure generation groove has a spiral shape that communicates only with the second peripheral edge of the sliding face.

According to this aspect, the pumping force of fluid present on the second of the sliding face can be increased, so that the leakage of fluid can be further prevented.

According to a twelfth aspect of the present invention, in the sliding component in any one of the first to tenth aspects, the dynamic pressure generation groove includes a pair of substantially L-shaped grooves arranged symmetrically that communicates only with the second peripheral edge of the sliding face.

According to this aspect, a predetermined dynamic pressure can be generated on the sliding face in either rotational direction of the rotating-side seal ring.

Effects of the Invention

The present invention achieves the following outstanding effects.

(1) By providing the fluid introduction groove configured to communicate with the first peripheral edge of the sliding face and not to communicate with the second peripheral edge of the sliding face, fluid present on the first side of the sliding face can be actively introduced into the sliding face in the low-speed rotation state of the rotating-side seal ring such as at the time of startup, to lubricate the sliding face. Fluid introduced into the sliding face through the fluid introduction groove is discharged by centrifugal force during high-speed rotation of the rotating-side seal ring such as in steady operation, so that the fluid does not leak to the inner peripheral side, the leakage side.

Further, by providing the dynamic pressure generation groove configured to communicate with the second peripheral edge of the sliding face and not to communicate with the first peripheral edge of the sliding face, in the high-speed rotation state of the rotating-side seal ring such as in steady operation, fluid present on the second side of the sliding face is sucked, generating dynamic pressure (positive pressure), so that a slight gap is formed between the sliding faces of the rotating-side seal ring and the stationary-side seal ring, and the sliding faces can be brought into a state of fluid lubrication and very low friction. At the same time, fluid present on the second side is pumped through the dynamic pressure generation groove toward the first side, and thus can prevent fluid on the first side from leaking to the second side.

(2) By providing the fluid introduction groove configured to communicate with the sealed fluid side of the sliding face and not to communicate with the leakage side of the sliding face, liquid or misty fluid present on the sealed fluid side of the sliding face can be actively introduced into the sliding face in the low-speed rotation state of the rotating-side seal ring such as at the time of startup, to lubricate the sliding face.

Liquid or misty fluid introduced into the sliding face through the fluid introduction groove is discharged by centrifugal force during high-speed rotation of the rotating-side seal ring such as in steady operation, so that the liquid or misty fluid does not leak to the inner peripheral side, the leakage side.

Further, by providing the dynamic pressure generation groove configured to communicate with the peripheral edge of the sliding face on the leakage side and not to communicate with the peripheral edge of the sliding face on the sealed fluid side, in the high-speed rotation state of the rotating-side seal ring such as in steady operation, fluid is sucked from the leakage side, generating dynamic pressure (positive pressure), so that a slight gap is formed between the sliding faces of the rotating-side seal ring and the stationary-side seal ring, and the sliding faces can be brought into a state of fluid lubrication and very low friction. At the same time, fluid on the leakage side is pumped through the dynamic pressure generation groove toward the sealed fluid side, and thus can prevent liquid or misty fluid on the sealed fluid side from leaking to the leakage side.

(3) By providing the fluid introduction groove and the dynamic pressure generation groove only in the sliding face of the rotating-side seal ring, fluid introduced into the sliding face through the fluid introduction groove is discharged by centrifugal force during high-speed rotation of the rotating-side seal ring such as in steady operation, so that liquid or misty fluid does not leak to the inner peripheral side, the leakage side.

Further, in the high-speed rotation state of the rotating-side seal ring such as in steady operation, fluid is sucked more from the leakage side, generating dynamic pressure (positive pressure), so that a slight gap is formed between the sliding faces of the rotating-side seal ring and the stationary-side seal ring, and the sliding faces can be brought into a state of fluid lubrication and very low friction.

Further, a combination of the material of the rotating-side seal ring being silicon carbide (SiC) and the material of the stationary-side seal ring being carbon is possible, which can prevent damage to the sliding faces if the sliding faces become dry.

(4) By providing the fluid introduction groove and the dynamic pressure generation groove only in the sliding face of the stationary-side seal ring, fluid present on the first side of the sliding face can be more actively introduced into the sliding face in the low-speed rotation state of the rotating-side seal ring opposite such as at the time of startup, to lubricate the sliding face.

(5) By providing the fluid introduction groove in the sliding face of one of the rotating-side seal ring and the stationary-side seal ring, and the dynamic pressure generation groove in the sliding face of the other of the rotating-side seal ring and the stationary-side seal ring, processing to form the fluid introduction groove and the dynamic pressure generation groove can be easily performed.

(6) By providing the fluid introduction groove on the first radial side of the sliding face, and the dynamic pressure generation groove on the second radial side of the sliding face, and providing the degassing groove between the fluid introduction groove and the dynamic pressure generation groove, fluid sucked from the first side can be prevented from being mixed into fluid on the second side and destabilizing dynamic pressure generation, so that dynamic pressure generation can be stabilized.

Further, fluid on the first side can be prevented from leaking to the second side.

(7) The fluid introduction groove is provided along the first peripheral edge of the sliding face, has the opening that is open only to the first peripheral edge of the sliding face, and is formed in the tapered shape largest at the opening, so that fluid present on the first side of the sliding face can easily enter the sliding face in the low-speed rotation state of the rotating-side seal ring such as at the time of startup, contributing to the lubrication of the sliding face.

(8) The fluid introduction groove is provided along the first peripheral edge of the sliding face, has the opening that is open only to the first peripheral edge of the sliding face, and is formed in the shape radially cut in the arc shape at the side opposite to the opening, so that fluid can be introduced into the sliding face in either rotational direction of the rotating-side seal ring.

(9) The fluid introduction groove is provided along the first peripheral edge of the sliding face, and includes the fluid introduction portion and the fluid discharge portion that communicate only with the first peripheral edge of the sliding face, and the fluid communication portion that circumferentially connects the fluid introduction portion and the fluid discharge portion, so that fluid present on the first side of the sliding face can be more actively introduced into the sliding face in the low-speed rotation state of the rotating-side seal ring such as at the time of startup, to lubricate the sliding face.

(10) By providing the positive pressure generation mechanism with the positive pressure generation groove that communicates, at the upstream end, with the fluid introduction groove, positive pressure (dynamic pressure) is generated even in the low-speed rotation state of the rotating-side seal ring such as at the time of startup, in particular, so that a liquid film on the sliding faces at low speeds is increased, and lubrication performance at low speeds can be improved.

(11) By the dynamic pressure generation groove having the spiral shape that communicates only with the second peripheral edge of the sliding face, the pumping force of fluid present on the second of the sliding face can be increased, so that the leakage of fluid can be further prevented.

(12) By the dynamic pressure generation groove including the pair of substantially L-shaped grooves arranged symmetrically that communicates only with the second peripheral edge of the sliding face, a predetermined dynamic pressure can be generated on the sliding face in either rotational direction of the rotating-side seal ring.

BRIEF DESCRIPTION OF THE DRAWINGS

FIG. 5 shows explanatory diagrams for plainly explaining the state of the sliding faces in the first to third embodiments.

DESCRIPTION OF EMBODIMENTS

Hereinafter with reference to the drawings, forms for implementing this invention will be described illustratively based on embodiments. However, the dimensions, materials, shapes, relative arrangements, and others of components described in the embodiments are not intended to limit the scope of the present invention only to them unless otherwise explicitly described.

First Embodiment

Figure 1:
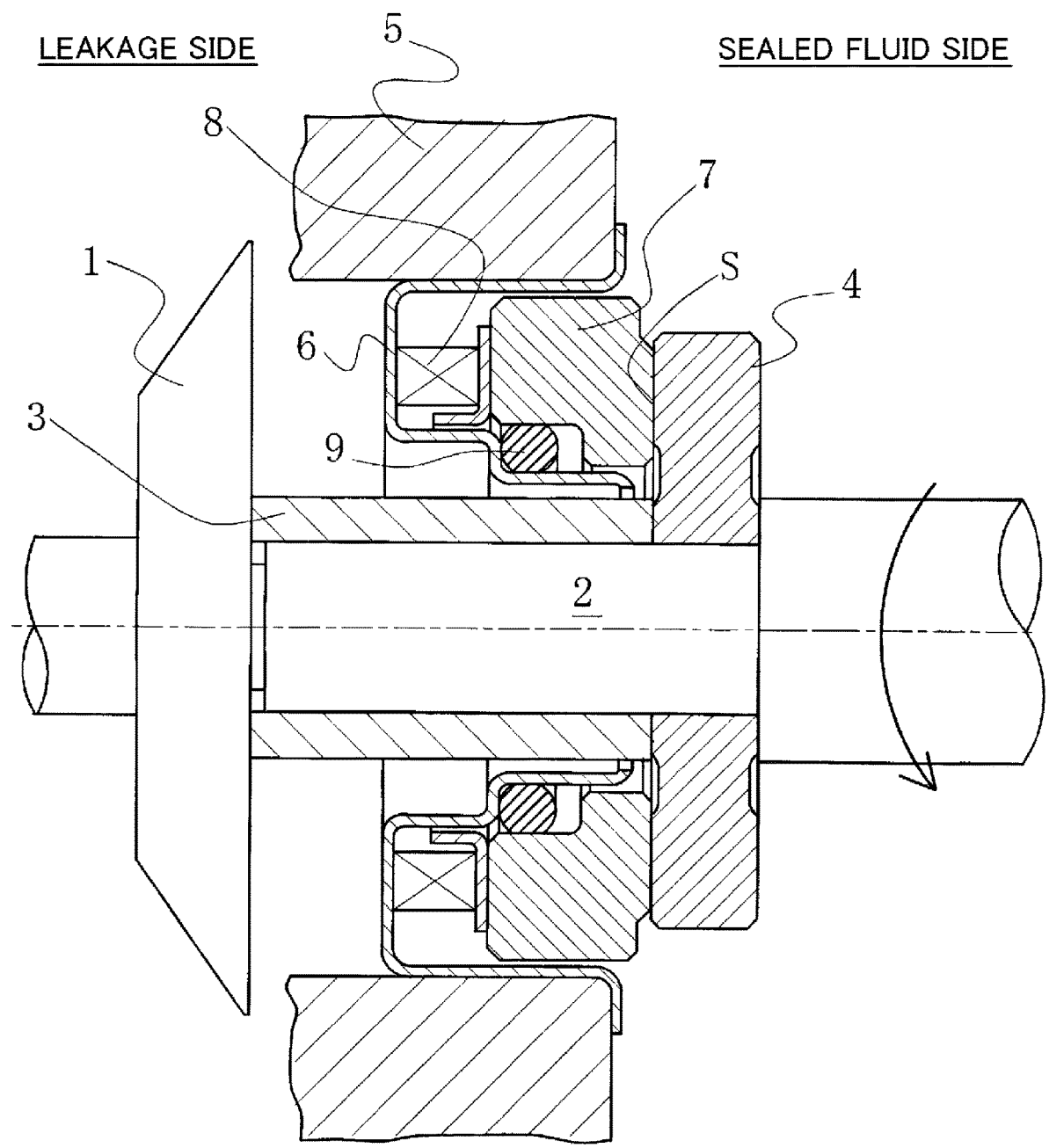
FIG. 1 is a vertical cross-sectional view showing an example of a mechanical seal according to a first embodiment of the present invention.
Figure 2:
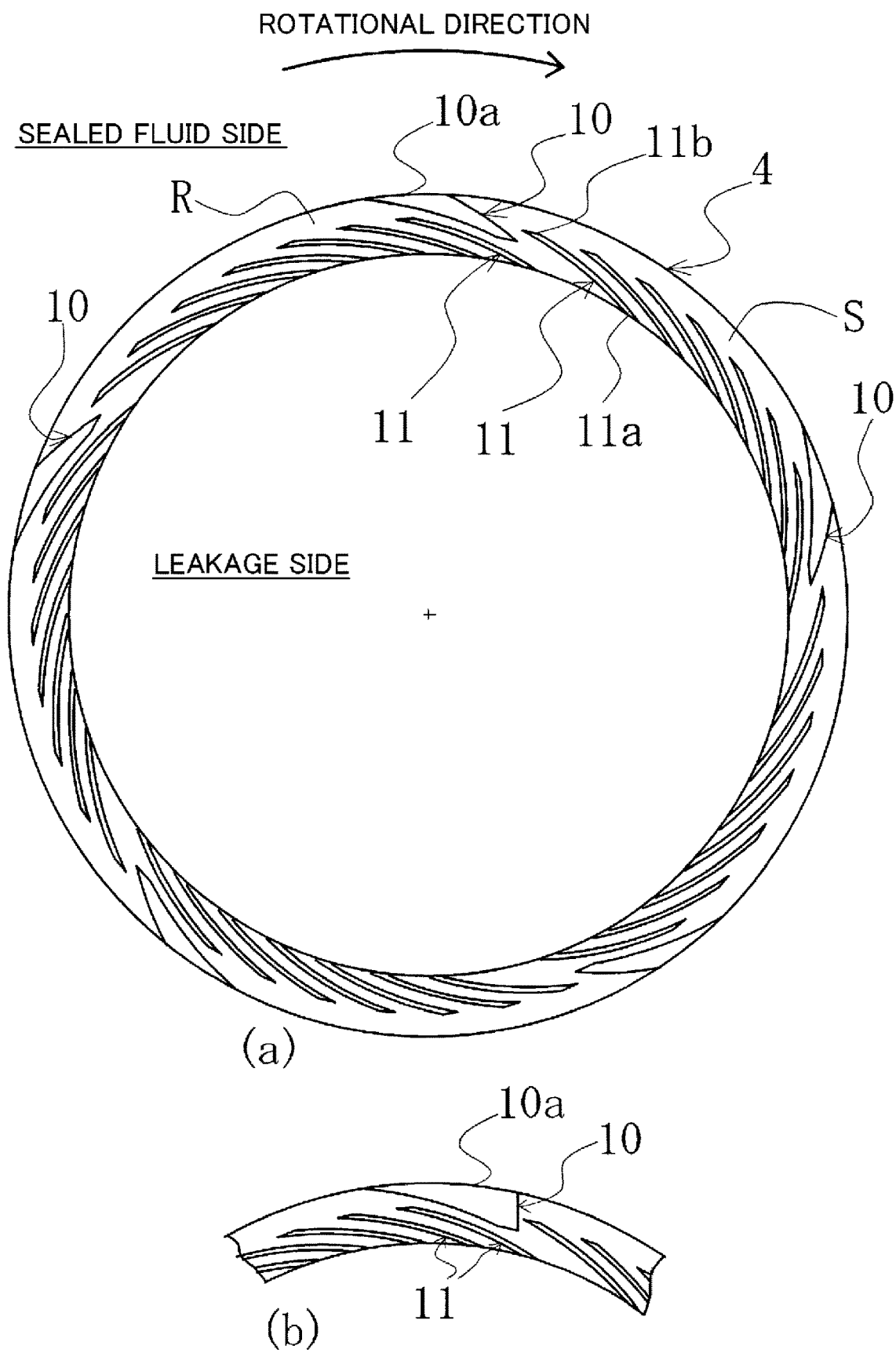
FIG. 2 shows a sliding face of a sliding part according to the first embodiment of the present invention, a sliding face of a rotating-side seal ring provided with fluid introduction grooves and dynamic pressure generation grooves.

With reference to FIGS. 1 and 2, a sliding component according to a first embodiment of the present invention will be described.

In the following embodiments, a mechanical seal, an example of a sliding component, will be described as an example. The outer peripheral side of the sliding parts constituting the mechanical seal is described as the sealed fluid side (liquid side or misty fluid side), and the inner peripheral side as the leakage side (gas side). The present invention, however, is not limited to this, and is applicable to a case where the outer peripheral side is the leakage side (gas side) and the inner peripheral side is the sealed fluid side (liquid side or misty fluid side). As for the pressure magnitude relationship between the sealed fluid side (liquid side or misty fluid side) and the leakage side (gas side), for example, the sealed fluid side (liquid side or misty fluid side) may be under a high pressure and the leakage side (gas side) under a lower pressure, and vice versa, or both sides may be under the same pressure.

FIG. 1 is a vertical cross-sectional view showing an example of the mechanical seal, which is an inside mechanical seal in a form of sealing sealed fluid tending to leaking from the outer periphery of sliding faces toward the inner periphery, e.g. lubricating oil used for a bearing. The mechanical seal is provided, at a rotating shaft 2 to drive an impeller 1 of a compressor provided in a turbocharger, with an annular rotating-side seal ring 4, one sliding part, provided in a state of being rotatable with the rotating shaft 2 in an integrated manner via a sleeve 3, and at a housing 5, with an annular stationary-side seal ring 7, the other sliding part, provided in a non-rotating state and in an axially movable state via a cartridge 6. By a coiled wave spring 8 axially urging the stationary-side seal ring 7, the rotating-side seal ring 4 and the stationary-side seal ring 7 slide in close contact with each other on sliding faces S mirror-finished by lapping or the like. That is, in the mechanical seal, the rotating-side seal ring 4 and the stationary-side seal ring 7 have the sliding faces S formed radially, and prevent, at each other's sliding faces S, the sealed fluid, e.g. liquid or misty fluid (hereinafter, sometimes referred to simply as "liquid") from flowing out from the outer periphery of the sliding faces S to the leakage side, the inner peripheral side.

Reference numeral 9 denotes an O-ring that seals a space between the cartridge 6 and the stationary-side seal ring 7.

In this example, a case where the sleeve 3 and the rotating-side seal ring 4 are separate is described, but the present invention is not limited to this. The sleeve 3 and the rotating-side seal ring 4 may be integrally formed.

The materials of the rotating-side seal ring 4 and the stationary-side seal ring 7 are selected from silicon carbide (SiC) excellent in wear resistance, carbon excellent in self-lubricity, and the like. For example, both of them may be SiC, or a combination of one of them being SiC and the other being carbon is possible.

FIG. 2 shows a sliding face of a sliding part according to the first embodiment of the present invention. In this example, a case where a sliding face of the rotating-side seal ring 4 in FIG. 1 is provided with fluid introduction grooves 10 and dynamic pressure generation grooves 11 will be described.

In this example, since the sliding face of the rotating-side seal ring 4 is processed to form the fluid introduction grooves 10 and the dynamic pressure generation grooves 11 therein, the rotating-side seal ring 4 is formed of silicon carbide (SiC), and the stationary-side seal ring 7 is formed of carbon.

In FIG. 2, suppose the outer peripheral side of the sliding face S of the rotating-side seal ring 4 is the sealed fluid side, e.g. the liquid side, the inner peripheral side is the leakage side, e.g. the gas side, and the rotating-side seal ring 4 rotates in a clockwise direction as shown by an arrow.

The sliding face S of the rotating-side seal ring 4 is provided with the fluid introduction grooves 10 configured to communicate with a peripheral edge of the sliding face S on the sealed fluid side, i.e. the outer peripheral side, and not to communicate with a peripheral edge on the leakage side, i.e. the inner peripheral side, and is provided with the dynamic pressure generation grooves 11 configured to communicate with the peripheral edge of the sliding face S on the inner peripheral side and not to communicate with the peripheral edge on the outer peripheral side.

In FIG. 2A, the fluid introduction grooves 10 each have an opening 10a that is open only to the peripheral edge on the outer peripheral side, and are each formed in a tapered shape largest at the opening 10a. This allows liquid present on the outer peripheral side of the sliding face S to easily enter the sliding face in a low-speed rotation state of the rotating-side seal ring 5 such as at the time of startup, contributing to the lubrication of the sliding face S. The fluid introduction grooves 10 are formed in such a shape to be inclined radially inclined shape with upstream ends during rotation located radially inward, and with downstream ends opening to the peripheral edge on the outer peripheral side. This facilitates the discharge of the liquid introduced into the sliding face through the fluid introduction grooves 10 to the outer peripheral side by centrifugal force when the rotating-side seal ring 5 is in a high-speed rotation state such as in steady operation, and prevents the leakage of liquid to the inner peripheral side, the leakage side.

In this example, five fluid introduction grooves 10 are circumferentially evenly spaced. However, it is only necessary to provide at least one fluid introduction groove 10, and they are not necessarily evenly spaced.

On the other hand, the dynamic pressure generation grooves 11 are configured to communicate with the peripheral edge of the sliding face S on the inner peripheral side and not to communicate with the peripheral edge on the outer peripheral side, and have a spiral shape. Through the dynamic pressure generation grooves 11, gas is sucked from inlets 11a on the inner peripheral side in the high-speed rotation state of the rotating-side seal ring 4 such as in steady operation, generating dynamic pressure (positive pressure) in the vicinity of ends 11b on the outer peripheral side. This forms a slight gap between the sliding faces S of the rotating-side seal ring 4 and the stationary-side seal ring 7, bringing the sliding faces S into the state of gas lubrication and very low friction. At the same time, through the spiral dynamic pressure generation grooves 11, gas on the inner peripheral side is pumped toward the outer peripheral side, preventing liquid on the outer peripheral side from leaking to the inner peripheral side. The spiral dynamic pressure generation grooves 11 are spaced from the outer peripheral side by a land R, so that leakage does not occur during rest.

In this example, a large number of spiral dynamic pressure generation grooves 11 are circumferentially arranged in positions where they do not interfere with the fluid introduction grooves 10. The arrangement form is determined in terms of design by taking operation conditions and others into consideration.

The fluid introduction grooves 10 are desirably of a shape open largely to the outer peripheral side (liquid side) to the extent that they do not interfere with dynamic pressure generation by the dynamic pressure generation grooves 11, to accelerate the introduction of liquid. As shown in FIG. 2B, for example, the fluid introduction grooves 10 are desirably formed in substantially a right triangle shape, and set such that a portion corresponding to the base is open to the outer peripheral side, the short side perpendicular to the base is located upstream during rotation and extended radially inward, and the hypotenuse is inclined downstream to the outer peripheral side during rotation.

The depth of the fluid introduction grooves 10 is set adequately deeper than the depth of the dynamic pressure generation grooves 11, and is set at about 25 µm to 500 µm, for example.

The configuration of the first embodiment described above achieves the following effects.

(1) The sliding face S of the rotating-side seal ring is provided with the fluid introduction grooves 10 configured to communicate with the peripheral edge of the sliding face S on the sealed fluid side, i.e. the outer peripheral side, and not to communicate with the peripheral edge on the leakage side, i.e. the inner peripheral side, so that liquid present on the outer peripheral side of the sliding face S can be actively introduced into the sliding face S in the low-speed rotation state of the rotating-side seal ring 4 such as at the time of startup, to lubricate the sliding face S.

Further, the liquid introduced into the sliding face through the fluid introduction grooves 10 is discharged by centrifugal force during high-speed rotation of the rotating-side seal ring 4 such as in steady operation, so that the liquid does not leak to the inner peripheral side, the leakage side.

(2) The dynamic pressure generation grooves 11 configured to communicate with the peripheral edge of the sliding face S on the inner peripheral side and not to communicate with the peripheral edge on the outer peripheral side are provided, so that gas is sucked from the inlets 11a on the inner peripheral side in the high-speed rotation state of the rotating-side seal ring 4 such as in steady operation, generating dynamic pressure (positive pressure) in the vicinity of the ends 11b on the outer peripheral side. Thus, a slight gap is formed between the sliding faces S of the rotating-side seal ring and the stationary-side seal ring 7, and the sliding faces S can be brought into a state of gas lubrication and very low friction. At the same time, through the spiral dynamic pressure generation grooves 11, gas on the inner peripheral side is pumped toward the outer peripheral side, and thus can prevent liquid on the outer peripheral side from leaking to the inner peripheral side.

(3) The provision of the fluid introduction grooves 10 and the dynamic pressure generation grooves 11 on the rotating-side seal ring 4 allows a combination of the material of the rotating-side seal ring 4 being silicon carbide (SiC) and the material of the stationary-side seal ring 7 being carbon, which can prevent damage to the sliding faces if the sliding faces become dry.

Second Embodiment

Figure 3:
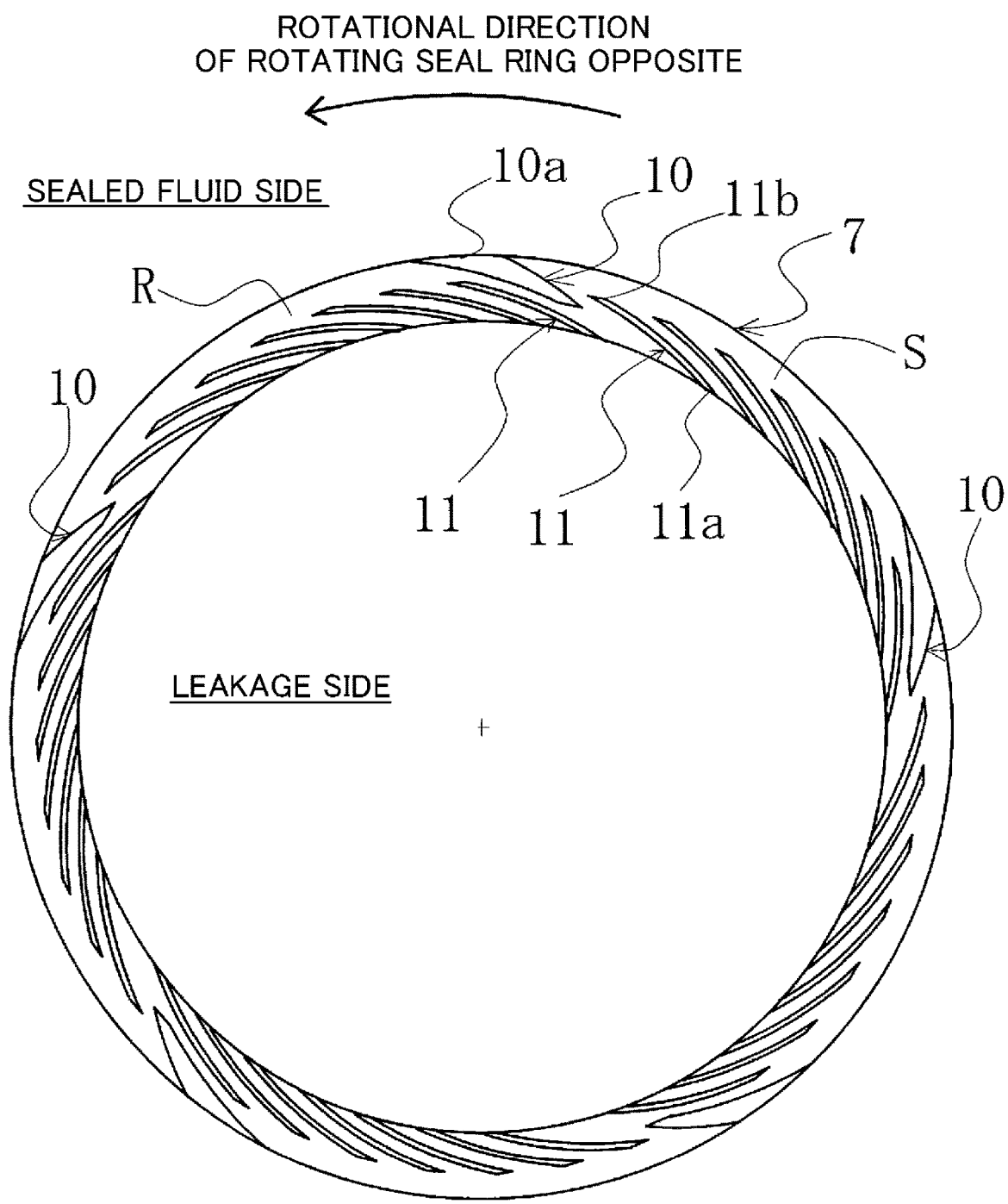
FIG. 3 shows a sliding face of a sliding part according to a second embodiment of the present invention, a sliding face of a stationary-side seal ring provided with fluid introduction grooves and dynamic pressure generation grooves.

With reference to FIG. 3, a sliding component according to a second embodiment of the present invention will be described.

The sliding component according to the second embodiment is different from the sliding component in the first embodiment in that fluid introduction grooves 10 and dynamic pressure generation grooves 11 are provided in a stationary-side seal ring 7, but the other basic configuration is identical to that in the first embodiment. The same members are provided with the same reference numerals and letters to omit redundant descriptions.

In FIG. 3, suppose the outer peripheral side of a sliding face S of the stationary-side seal ring 7 is the sealed fluid side, e.g. the liquid side, the inner peripheral side is the leakage side, e.g. the gas side, and a rotating-side seal ring 4 opposite rotates in a counterclockwise direction as shown by an arrow.

The sliding face S of the stationary-side seal ring 7 is provided with the fluid introduction grooves 10 configured to communicate with a peripheral edge on the outer peripheral side, and not to communicate with a peripheral edge on the inner peripheral side, and is provided with the dynamic pressure generation grooves 11 configured to communicate with the peripheral edge of the sliding face S on the inner peripheral side and not to communicate with the peripheral edge on the outer peripheral side.

As described above, the sliding face S of the stationary-side seal ring 7 is provided with the fluid introduction grooves 10, so that liquid present on the outer peripheral side of the sliding face S can be more actively introduced into the sliding face S than in the first embodiment in a low-speed rotation state of the rotating-side seal ring 5 opposite such as at the time of startup, to lubricate the sliding face S.

Further, during high-speed rotation of the rotating-side seal ring 5 opposite such as in steady operation, the liquid introduced into the sliding face through the fluid introduction grooves 10 is discharged under centrifugal force, which is slightly weaker than in the first embodiment, by the viscosity of the liquid, so that the liquid does not leak to the inner peripheral side, the leakage side.

Further, by providing the dynamic pressure generation grooves 11, in the high-speed rotation state of the rotating-side seal ring 5 opposite such as in steady operation, gas is sucked from inlets 11a on the inner peripheral side, which is slightly weaker than in the first embodiment, by the viscosity of the gas, generating dynamic pressure (positive pressure) in the vicinity of ends 11b on the outer peripheral side. Thus, a slight gap is formed between the sliding faces S of the rotating-side seal ring and the stationary-side seal ring 7, and the sliding faces S can be brought into a state of gas lubrication and very low friction. At the same time, through the spiral dynamic pressure generation grooves 11, gas on the inner peripheral side is pumped toward the outer peripheral side, which is slightly weaker than in the first embodiment, and thus can prevent liquid on the outer peripheral side from leaking to the inner peripheral side.

Third Embodiment

Figure 4:
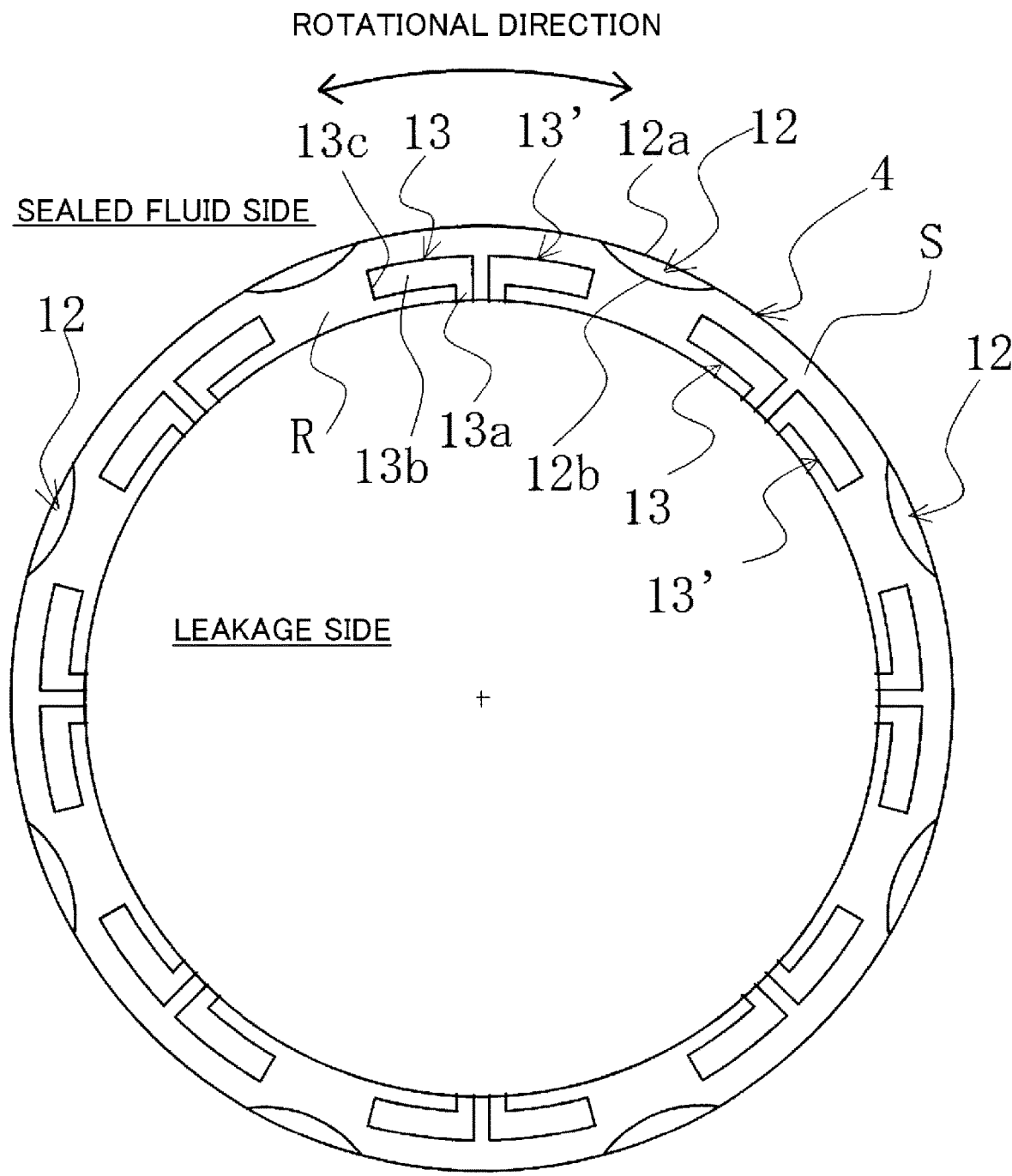
FIG. 4 shows a sliding face of a sliding part according to a third embodiment of the present invention.

With reference to FIG. 4, a sliding component according to a third embodiment of the present invention will be described.

The sliding component according to the third embodiment is different from that in the first embodiment in the shapes of fluid introduction grooves and dynamic pressure generation grooves, but the other basic configuration is identical to that in the first embodiment. The same members are provided with the same reference numerals and letters to omit redundant descriptions.

In FIG. 4, suppose the outer peripheral side of a sliding face S of a rotating-side seal ring 4 is the sealed fluid side, e.g. the liquid side, the inner peripheral side is the leakage side, e.g. the gas side, and the rotating-side seal ring 4 can rotate in both directions as shown by arrows.

The sliding face S of the rotating-side seal ring 4 is provided with fluid introduction grooves 12 configured to communicate with a peripheral edge on the outer peripheral side, and not to communicate with a peripheral edge on the inner peripheral side, and is provided with dynamic pressure generation grooves 13 configured to communicate with the peripheral edge of the sliding face S on the inner peripheral side and not to communicate with the peripheral edge on the outer peripheral side.

The fluid introduction grooves 12 are provided along the peripheral edge of the sliding face S on the outer peripheral side, and each have an opening 12a that is open only to the peripheral edge of the sliding face S on the outer peripheral side, and a side 12b opposite to the opening 12a and formed in a shape radially cut in an arc shape. Specifically, the fluid introduction grooves 12 have a substantially crescent shape. This facilitates the entry of liquid present on the outer peripheral side of the sliding face S into the fluid introduction grooves 12 in a low-speed rotation state of the rotating-side seal ring 4 such as at the time of startup, contributing to the lubrication of the sliding face S. When the rotating-side seal ring 4 is in a high-speed rotation state such as in steady operation, the liquid introduced into the sliding face through the fluid introduction grooves 12 is discharged by centrifugal force, and the liquid does not leak to the inner peripheral side, the leakage side.

Further, since the fluid introduction grooves 12 have the substantially crescent shape, the same action can be produced in either rotational direction of the rotating-side seal ring 4.

Eight fluid introduction grooves 12 are circumferentially evenly spaced, but the present invention is not limited to this. It is only necessary to provide at least one fluid introduction groove 12.

The dynamic pressure generation grooves 13 each have a radial communication portion 13a that communicates only with the peripheral edge of the sliding face S on the inner peripheral side and a dynamic pressure generation portion 13b extending circumferentially, and are substantially L-shaped. Dynamic pressure generation grooves 13' are arranged circumferentially symmetrically with respect to the dynamic pressure generation grooves 13, and both form a pair.

Now, suppose the rotating-side seal ring 4 rotates in a clockwise direction. Through the dynamic pressure generation grooves 13 located downstream, gas is sucked from the radial communication portions 13a on the inner peripheral side in a high-speed rotation state of the rotating-side seal ring 4 such as in steady operation, generating dynamic pressure (positive pressure) in the vicinity of ends 13c of the dynamic pressure generation portions 13b extending circumferentially. This forms a slight gap between the sliding faces S of the rotating-side seal ring 4 and the stationary-side seal ring 7, bringing the sliding faces S into a state of gas lubrication and very low friction. At the same time, through the substantially L-shaped dynamic pressure generation grooves 13, gas on the inner peripheral side is pumped toward the outer peripheral side, thus preventing liquid on the outer peripheral side from leaking to the inner peripheral side.

Further, since a pair of dynamic pressure generation grooves 13 is arranged symmetrically in circumferentially close proximity, the same action can be produced in either rotational direction of the rotating-side seal ring 4.

In this example, eight substantially L-shaped dynamic pressure generation grooves 13 are circumferentially evenly spaced in positions where they do not interfere with the fluid introduction grooves 12, but the present invention is not limited to this. The number of the dynamic pressure generation grooves 13 can be determined in terms of design by taking operation conditions and others into consideration, and may be reduced by circumferentially lengthening the dynamic pressure generation grooves 13 to the extent that they do not interfere with the fluid introduction grooves 12, for example.

In this example, a pair of substantially L-shaped dynamic pressure generation grooves 13 is arranged symmetrically in circumferentially close proximity. Alternatively, two dynamic pressure generation grooves 13 may be integrated into substantially a T shape to produce the same action and effects as in this example.

(Explanation of State of Sealing Face in First to Third Embodiments)

Here, with reference to FIG. 5, the state of the sliding face in the first to third embodiments will be plainly described.

FIG. 5A is a basic configuration diagram for explaining the functions of fluid introduction grooves and dynamic pressure generation grooves on a sliding face provided with the fluid introduction grooves and the dynamic pressure generation grooves.

When liquid, sealed fluid, is present on the outer peripheral side of the sliding face and gas on the leakage side, the inner peripheral side, for example, the fluid introduction grooves serve a function of introducing the liquid on the outer peripheral side into the sliding face to bring the sliding face into a non-contacting state during low-speed rotation, and blowing liquid on the sliding face away by centrifugal force to invalidate the effect of the liquid during high-speed rotation.

On the other hand, the dynamic pressure generation grooves serve a function of preventing leakage from the outer peripheral side to the inner peripheral side during low-speed rotation, and sucking gas on the inner peripheral side to bring the sliding face into a non-contacting state, and a gas seal mechanism during high-speed rotation.

FIG. 5B is a diagram for explaining a state during low-speed rotation. Liquid on the outer peripheral side is introduced into the sliding face through the fluid introduction grooves so that the sliding face is kept in the non-contacting state by fluid lubrication action. On the other hand, the dynamic pressure generated on the inner peripheral side is small and thus gas is not taken in adequately, but leakage to the inner peripheral side is prevented.

FIG. 5C is a diagram for explaining a state during high-speed rotation. The liquid introduced into the sliding face is blown away to the outer peripheral side by centrifugal force, and thus the fluid lubrication action by the liquid on the sliding face is invalidated. On the other hand, the dynamic pressure generated on the inner peripheral side is large and thus gas is taken in adequately. The sliding face is maintained in the non-contacting state and the pressure at the sliding face is increased, so that liquid on the outer peripheral side does not leak to the inner peripheral side. It is in a state of so-called gas seal.

Fourth Embodiment

Figure 6:
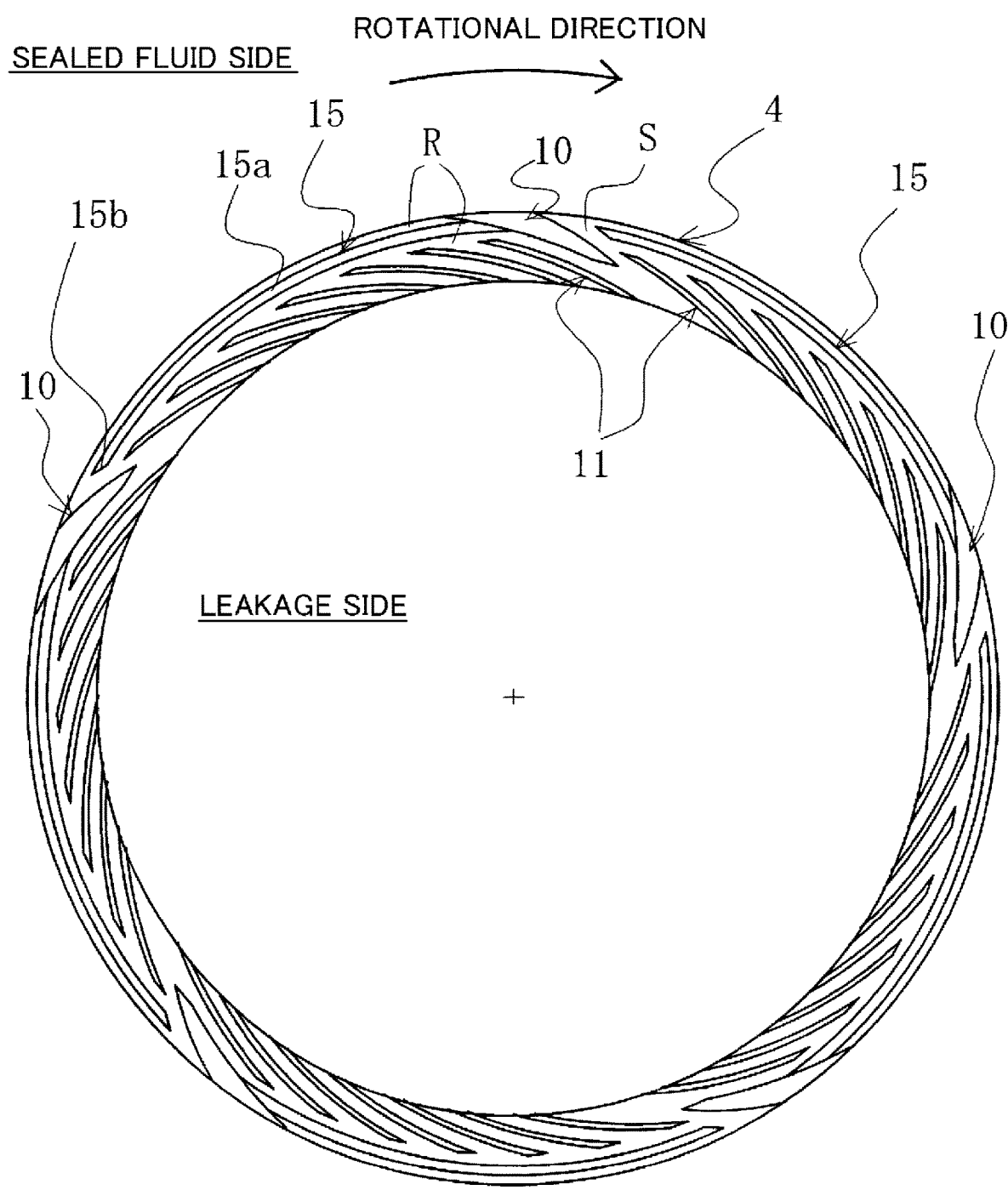
FIG. 6 shows a sliding face of a sliding part according to a fourth embodiment of the present invention.

With reference to FIG. 6, a sliding component according to a fourth embodiment of the present invention will be described.

The sliding component according to the fourth embodiment is different from that in the first embodiment in that positive pressure generation mechanisms are additionally provided, but the other basic configuration is identical to that in the first embodiment. The same members are provided with the same reference numerals and letters to omit redundant descriptions.

In FIG. 6, a sliding face S of a rotating-side seal ring 4 is provided with fluid introduction grooves 10 configured to communicate with a peripheral edge of the sliding face S on the sealed fluid side, i.e. the outer peripheral side, and not to communicate with a peripheral edge on the leakage side, i.e. the inner peripheral side, and is provided with dynamic pressure generation grooves 11 configured to communicate with the peripheral edge of the sliding face S on the inner peripheral side and not to communicate with the peripheral edge on the outer peripheral side.

Positive pressure generation mechanisms 15 with positive pressure generation grooves 15a shallower than the fluid introduction grooves 10 are provided in portions surrounded by the fluid introduction grooves 10, the dynamic pressure generation grooves 11, and the outer peripheral side. The positive pressure generation grooves 15a communicate, at upstream ends, with the fluid introduction grooves 10, and are spaced from the outer peripheral side and the dynamic pressure generation grooves 11 by a land R, and generate positive pressure (dynamic pressure) at Rayleigh steps 15b downstream, thereby increasing a fluid film between the sliding faces, improving lubrication performance. The positive pressure generation mechanisms 15 generate positive pressure (dynamic pressure) even in a low-speed rotation state of the rotating-side seal ring 4 such as at the time of startup, in particular, and thus can increase a liquid film between the sliding faces at low speeds, improving lubrication performance at low speeds.

Fifth Embodiment

Figure 7:
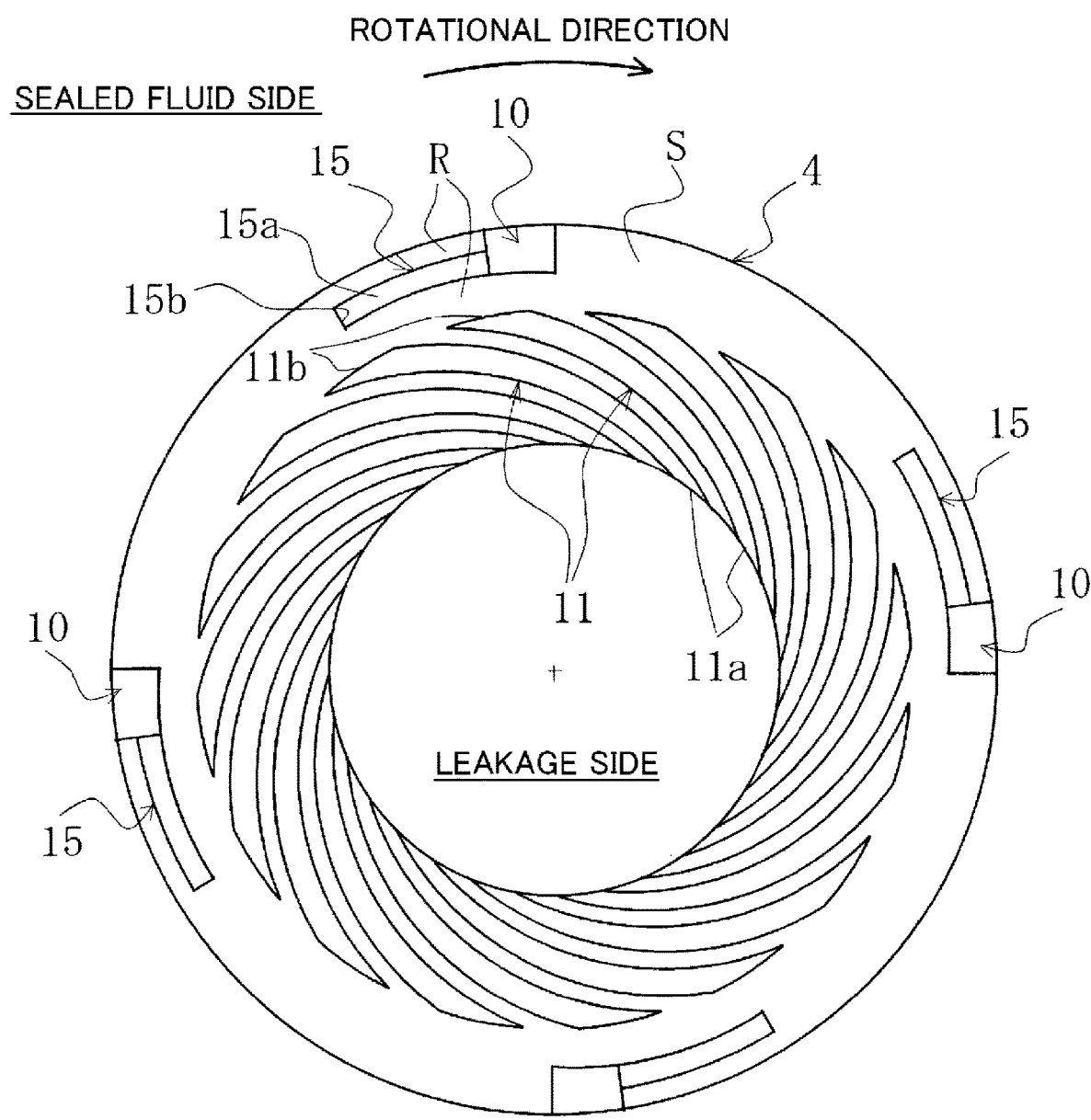
FIG. 7 shows a sliding face of a sliding part according to a fifth embodiment of the present invention.

With reference to FIG. 7, a sliding component according to a fifth embodiment of the present invention will be described.

The sliding component according to the fifth embodiment is different from that in the first embodiment in that the shape of fluid introduction grooves is different and that positive pressure generation mechanisms are additionally provided, but the other basic configuration is identical to that in the first embodiment. The same members are provided with the same reference numerals and letters to omit redundant descriptions.

In FIG. 7, a sliding face S of a rotating-side seal ring 4 is provided with fluid introduction grooves 10 configured to communicate with a peripheral edge of the sliding face S on the sealed fluid side, i.e. the outer peripheral side and not to communicate with a peripheral edge on the leakage side, i.e. the inner peripheral side, and is provided with dynamic pressure generation grooves 11 in a spiral planar shape configured to communicate with the peripheral edge of the sliding face S on the inner peripheral side and not to communicate with the peripheral edge on the outer peripheral side.

The fluid introduction grooves 10 are arranged along the peripheral edge on the outer peripheral side and formed in a substantially rectangular planar shape, communicate with the sealed fluid side at the peripheral edge of the sliding face S on the outer peripheral side, and are spaced from the inner peripheral side by a land R.

Positive pressure generation mechanisms 15 with positive pressure generation grooves 15a shallower than the fluid introduction grooves 10 are provided in communication with circumferentially downstream ends of the fluid introduction grooves 10. The positive pressure generation mechanisms 15 generate positive pressure (dynamic pressure), thereby increasing a fluid film between the sliding faces, improving lubrication performance.

The positive pressure generation grooves 15a communicate, at upstream ends, with the fluid introduction grooves 10, and are spaced from the outer peripheral side by the land R.

In this example, the positive pressure generation mechanisms 15 are formed from Rayleigh step mechanisms including the positive pressure generation grooves 15a communicating with the fluid introduction grooves 10 at the upstream ends and Rayleigh steps 15b, but are not limited to this. It is essential only that they be mechanisms generating positive pressure.

In FIG. 7, a planar shape formed by the fluid introduction grooves 10 and the positive pressure generation mechanisms 15 is substantially an inverted L shape.

Now, suppose the rotating-side seal ring 4 rotates in a clockwise direction. Liquid on the outer peripheral side is introduced into the sliding face through the fluid introduction grooves 10 of the substantially rectangular shape, and the sliding face S can be lubricated. At that time, the positive pressure generation mechanisms 15 generate positive pressure (dynamic pressure), so that a fluid film between the sliding faces is increased and lubrication performance can be further improved.

During high-speed rotation of the rotating-side seal ring 4 such as in steady operation, the liquid introduced into the sliding face through the fluid introduction grooves 10 is discharged by centrifugal force, and thus the liquid does not leak to the inner peripheral side, the leakage side.

Further, in a high-speed rotation state of the rotating-side seal ring 4 such as in steady operation, gas is sucked from inlets 11a of the dynamic pressure generation grooves 11 on the inner peripheral side, and dynamic pressure (positive pressure) is generated in the vicinity of ends 11b on the outer peripheral side, so that a slight gap is formed between the sliding faces S of the rotating-side seal ring 4 and the stationary-side seal ring 7, and the sliding faces S can be brought into a state of gas lubrication and very low friction. At the same time, through the spiral dynamic pressure generation grooves 11, gas on the inner peripheral side is pumped toward the outer peripheral side, and thus can prevent liquid on the outer peripheral side from leaking to the inner peripheral side.

Sixth Embodiment

Figure 8:
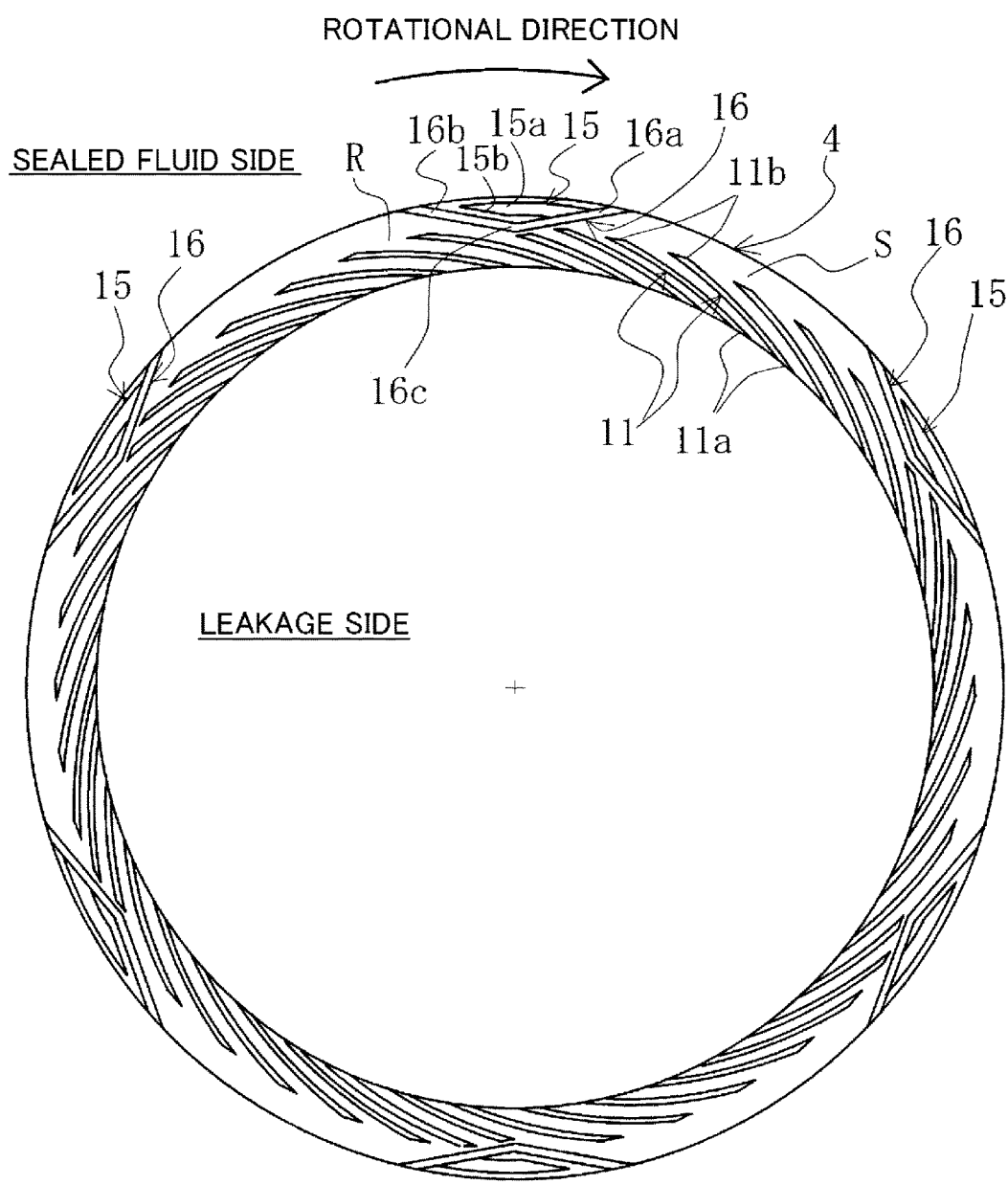
FIG. 8 shows a sliding face of a sliding part according to a sixth embodiment of the present invention.

With reference to FIG. 8, a sliding component according to a sixth embodiment of the present invention will be described.

The sliding component according to the sixth embodiment is different from that in the first embodiment in that the shape of fluid introduction grooves is different and that positive pressure generation mechanisms are additionally provided, but the other basic configuration is identical to that in the first embodiment. The same members are provided with the same reference numerals and letters to omit redundant descriptions.

In FIG. 8, a sliding face S of a rotating-side seal ring 4 is provided with fluid introduction grooves 16 configured to communicate with a peripheral edge of the sliding face S on the sealed fluid side, i.e. the outer peripheral side, and not to communicate with a peripheral edge on the leakage side, i.e. the inner peripheral side, and is provided with dynamic pressure generation grooves 11 in a spiral planar shape configured to communicate with the peripheral edge of the sliding face S on the inner peripheral side and not to communicate with the peripheral edge on the outer peripheral side.

The fluid introduction grooves 16 are arranged along the peripheral edge on the outer peripheral side, and each include a fluid introduction portion 16a and a fluid discharge portion 16b that communicate only with the peripheral edge of the sliding face S on the outer peripheral side, and a fluid communication portion 16c that connects them circumferentially, and are spaced from the inner peripheral side by a land R.

In this example, the fluid introduction portions 16a and the fluid discharge portions 16b are each formed radially from the inside to the outside of the sliding face, and are formed in substantially a V shape, but are not particularly limited to this. The fluid introduction portions 16a and the fluid discharge portions 16b may be further increased in inclination, or may be formed in a curved shape (such as an arc shape) instead of a linear shape.

Positive pressure generation mechanisms 15 with positive pressure generation grooves 15a shallower than the fluid introduction grooves 16 are provided in portions enclosed by the fluid introduction grooves 16 and the outer peripheral side. The positive pressure generation mechanisms 15 generate positive pressure (dynamic pressure), thereby increasing a fluid film between the sliding faces, improving lubrication performance.

The positive pressure generation grooves 15a communicate, at upstream ends, with the fluid introduction portions 16a, and are spaced from the fluid discharge portions 16b and the outer peripheral side by the land R.

In this example, the positive pressure generation mechanisms 15 are formed from Rayleigh step mechanisms including the positive pressure generation grooves 15a communicating, at the upstream ends, with the fluid introduction portions 16a of the fluid introduction grooves 15 and Rayleigh steps 15b, but are not limited to this. It is essential only that they be mechanisms generating positive pressure.

Now, suppose the rotating-side seal ring 4 rotates in a clockwise direction. Liquid on the outer peripheral side is introduced into the sliding face from the fluid introduction portions 16a of the substantially V-shaped fluid introduction grooves 16, and discharged to the outer peripheral side from the fluid discharge portions 16b. At that time, liquid present on the outer peripheral side of the sliding face S can be more actively introduced into the sliding face S in a low-speed rotation state of the rotating-side seal ring 4 such as at the time of startup, to lubricate the sliding face S. At that time, the positive pressure generation mechanisms 15 generate positive pressure (dynamic pressure), so that a fluid film between the sliding faces is increased, and lubrication performance can be further improved.

During high-speed rotation of the rotating-side seal ring 4 such as in steady operation, the liquid introduced into the sliding face through the fluid introduction grooves 16 is discharged by centrifugal force, and thus the liquid does not leak to the inner peripheral side, the leakage side.

Further, in a high-speed rotation state of the rotating-side seal ring 4 such as in steady operation, gas is sucked from inlets 11a of the dynamic pressure generation grooves 11 on the inner peripheral side, and dynamic pressure (positive pressure) is generated in the vicinity of ends 11b on the outer peripheral side, so that a slight gap is formed between the sliding faces S of the rotating-side seal ring 4 and the stationary-side seal ring 7, and the sliding faces S can be brought into a state of gas lubrication and very low friction. At the same time, through the spiral dynamic pressure generation grooves 11, gas on the inner peripheral side is pumped toward the outer peripheral side, and thus can prevent liquid on the outer peripheral side from leaking to the inner peripheral side.

Seventh Embodiment

Figure 9:
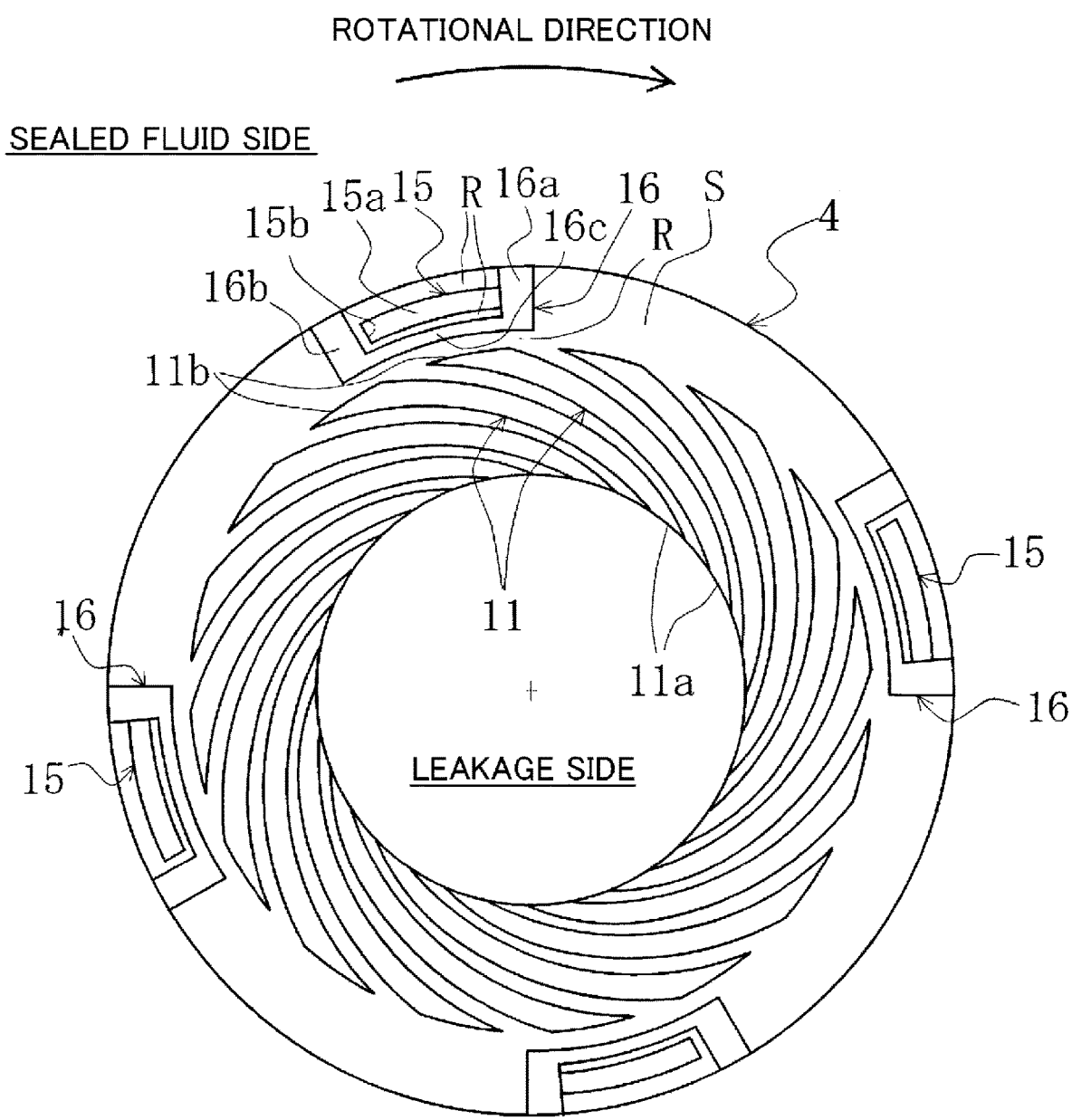
FIG. 9 shows a sliding face of a sliding part according to a seventh embodiment of the present invention.

With reference to FIG. 9, a sliding component according to a seventh embodiment of the present invention will be described.

The sliding component according to the seventh embodiment is different from that in the first embodiment in that the shape of fluid introduction grooves is different and that positive pressure generation mechanisms are additionally provided, but the other basic configuration is identical to that in the first embodiment. The same members are provided with the same reference numerals and letters to omit redundant descriptions.

In FIG. 9, a sliding face S of a rotating-side seal ring 4 is provided with fluid introduction grooves 16 configured to communicate with a peripheral edge of the sliding face S on the sealed fluid side, i.e. the outer peripheral side, and not to communicate with a peripheral edge on the leakage side, i.e. the inner peripheral side, and is provided with dynamic pressure generation grooves 11 in a spiral planar shape configured to communicate with the peripheral edge of the sliding face S on the inner peripheral side and not to communicate with the peripheral edge on the outer peripheral side.

The fluid introduction grooves 16 are arranged along the peripheral edge on the outer peripheral side, and each include a fluid introduction portion 16a and a fluid discharge portion 16b that communicate only with the peripheral edge of the sliding face S on the outer peripheral side, and a fluid communication portion 16c that connects them circumferentially, and are spaced from the inner peripheral side by a land R.

In this example, the fluid introduction portions 16a and the fluid discharge portions 16b are circumferentially spaced at a certain distance, and each extend radially linearly. Thus the fluid introduction grooves 16 have a substantially U-shaped planar shape.

Positive pressure generation mechanisms 15 with positive pressure generation grooves 15a shallower than the fluid introduction grooves 16 are provided in portions enclosed by the fluid introduction grooves 16 and the outer peripheral side. The positive pressure generation mechanisms 15 generate positive pressure (dynamic pressure), thereby increasing a fluid film between the sliding faces, improving lubrication performance.

The positive pressure generation grooves 15a communicate, at upstream ends, with the fluid introduction portions 16a, and are spaced from the fluid discharge portions 16b and the outer peripheral side by the land R.

In this example, the positive pressure generation mechanisms 15 are formed from Rayleigh step mechanisms including the positive pressure generation grooves 15a communicating, at the upstream ends, with the fluid introduction portions 16a of the fluid introduction grooves 15 and Rayleigh steps 15b, but are not limited to this. It is essential only that they be mechanisms generating positive pressure.

Now, suppose the rotating-side seal ring 4 rotates in a clockwise direction. Liquid on the outer peripheral side is introduced into the sliding face from the fluid introduction portions 16a of the substantially U-shaped fluid introduction grooves 16, and discharged to the outer peripheral side from the fluid discharge portions 16b. At that time, liquid present on the outer peripheral side of the sliding face S can be more actively introduced into the sliding face S in a low-speed rotation state of the rotating-side seal ring 4 such as at the time of startup, to lubricate the sliding face S. At that time, the positive pressure generation mechanisms 15 generate positive pressure (dynamic pressure), so that a fluid film between the sliding faces is increased, and lubrication performance can be further improved.

During high-speed rotation of the rotating-side seal ring 4 such as in steady operation, the liquid introduced into the sliding face through the fluid introduction grooves 16 is discharged by centrifugal force, and thus the liquid does not leak to the inner peripheral side, the leakage side.

Further, in a high-speed rotation state of the rotating-side seal ring 4 such as in steady operation, gas is sucked from inlets 11a of the dynamic pressure generation grooves 11 on the inner peripheral side, and dynamic pressure (positive pressure) is generated in the vicinity of ends 11b on the outer peripheral side, so that a slight gap is formed between the sliding faces S of the rotating-side seal ring 4 and the stationary-side seal ring 7, and the sliding faces S can be brought into a state of gas lubrication and very low friction. At the same time, through the spiral dynamic pressure generation grooves 11, gas on the inner peripheral side is pumped toward the outer peripheral side, and thus can prevent liquid on the outer peripheral side from leaking to the inner peripheral side.

Eighth Embodiment

With reference to FIG. 10, a sliding component according to an eighth embodiment of the present invention will be described.

The sliding component according to the eighth embodiment is different from that in the fourth embodiment in FIG. 6 in that fluid introduction grooves and positive pressure generation grooves are provided in a stationary-side seal ring and a rotating-side seal ring, respectively, but the other basic configuration is identical to that in the fourth embodiment. The same members are provided with the same reference numerals and letters to omit redundant descriptions.

Figure 10B:
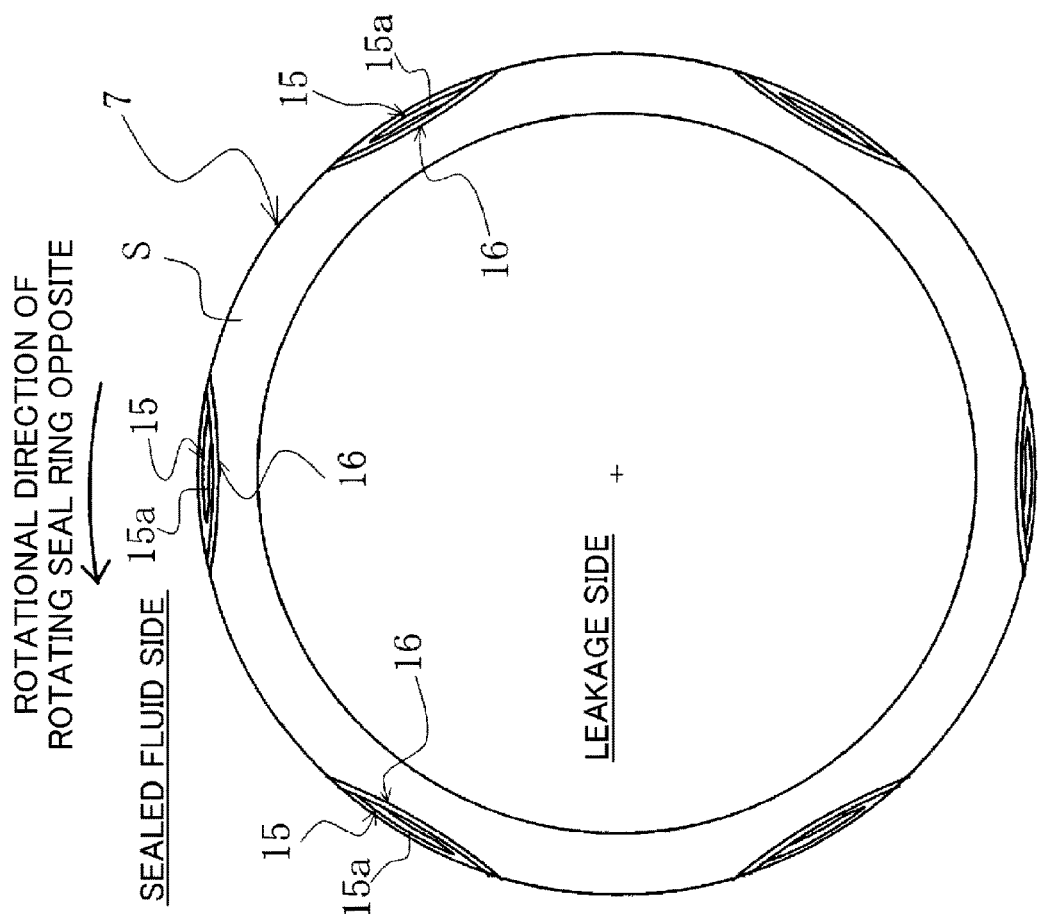
FIG. 10 shows sliding faces of sliding parts according to an eighth embodiment of the present invention.
Figure 10A:
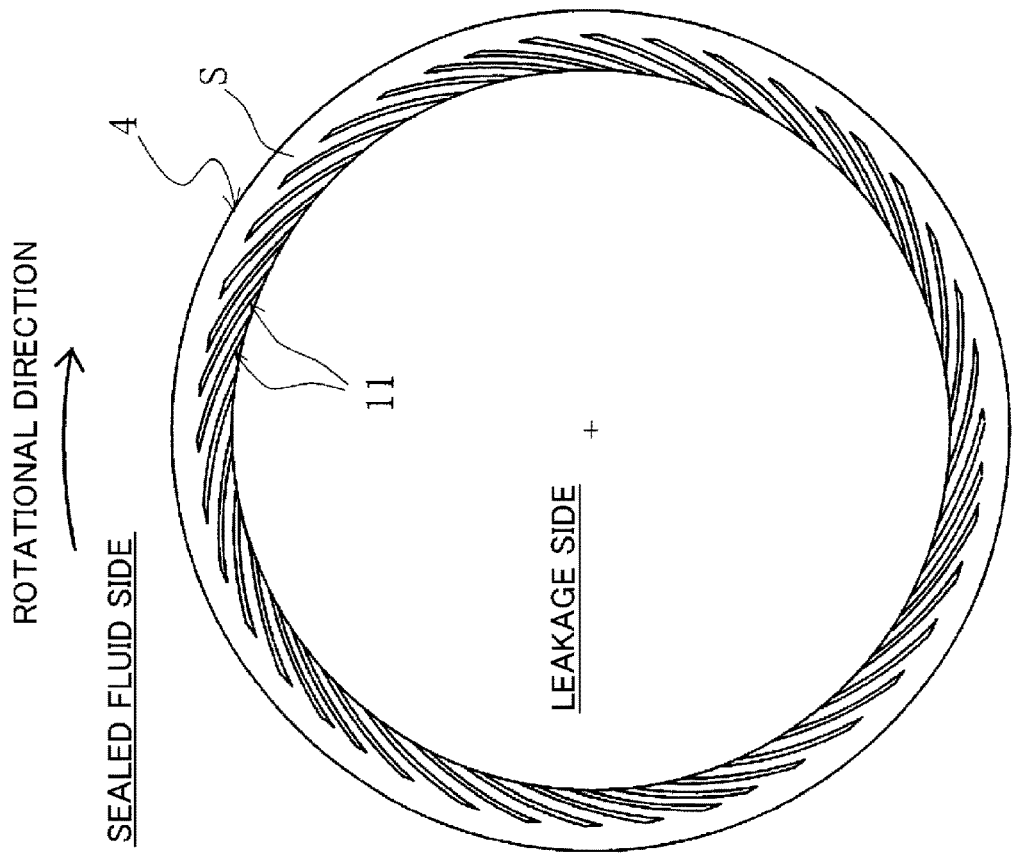

As shown in FIG. 10A, a sliding face S of a rotating-side seal ring 4 is provided with dynamic pressure generation grooves 11 configured to communicate with a peripheral edge of the sliding face S on the inner peripheral side and not to communicate with a peripheral edge on the outer peripheral side.

As shown in FIG. 10B, a sliding face S of a stationary-side seal ring 7 is provided with fluid introduction grooves 16 configured to communicate with a peripheral edge of the sliding face S on the sealed fluid side, i.e. the outer peripheral side, and not to communicate with a peripheral edge on the leakage side, i.e. the inner peripheral side. Further, positive pressure generation mechanisms 15 with positive pressure generation grooves 15a shallower than the fluid introduction grooves are provided in portions enclosed by the fluid introduction grooves 16 and the outer peripheral side.

The dynamic pressure generation grooves 11 and the fluid introduction grooves 16 are preferably arranged in non-overlapping positions.

The fluid introduction grooves 16 are provided in the sliding face S of the stationary-side seal ring 7, and the dynamic pressure generation grooves 11 are provided in the sliding face S of the rotating-side seal ring 4, but the present invention is not limited to this. They may be arranged reversely, that is, the dynamic pressure generation grooves 11 may be arranged in the sliding face S of the stationary-side seal ring 7, and the fluid introduction grooves 16 in the sliding face S of the rotating-side seal ring 4.

This example produces sealing and lubricity as in the fourth embodiment, and in addition, facilitates processing since the dynamic pressure generation grooves 11, and the fluid introduction grooves 16 and the positive pressure generation mechanisms 15 are provided in different sliding faces.

Ninth Embodiment

Figure 11:
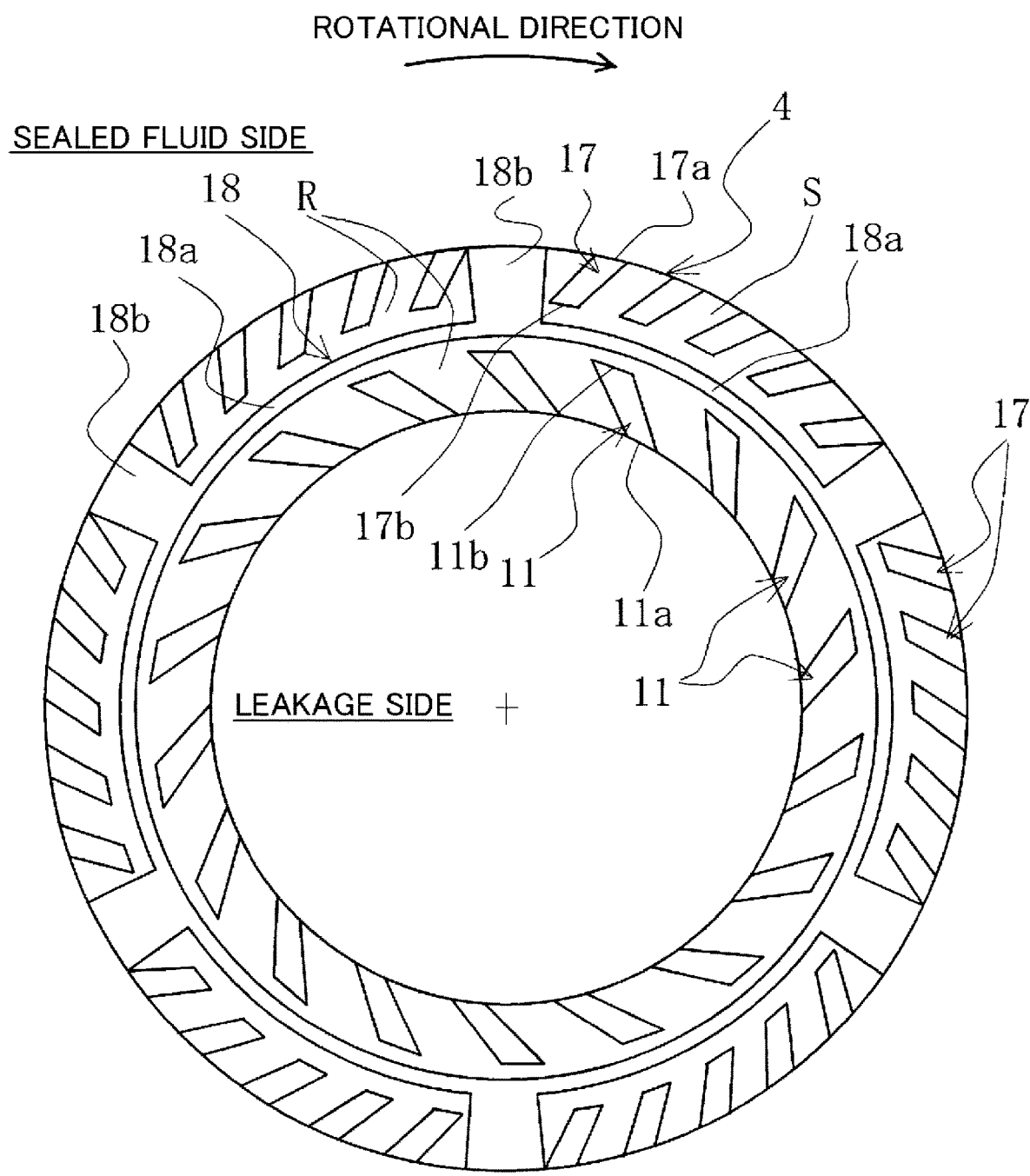
FIG. 11 shows a sliding face of a sliding part according to a ninth embodiment of the present invention.

With reference to FIG. 11, a sliding component according to a ninth embodiment of the present invention will be described.

The sliding component according to the ninth embodiment is different from that in the first embodiment in that a degassing groove is provided radially between fluid introduction grooves and dynamic pressure generation grooves, and that the fluid introduction grooves are of a spiral shape, but the other basic configuration is identical to that in the first embodiment. The same members are provided with the same reference numerals and letters to omit redundant descriptions.

In FIG. 11, a sliding face S of a rotating-side seal ring 4 is provided with fluid introduction grooves 17 configured to communicate with a peripheral edge of the sliding face S on the sealed fluid side, i.e. the outer peripheral side, and not to communicate with a peripheral edge on the leakage side, i.e. the inner peripheral side, and is provided with dynamic pressure generation grooves 11 configured to communicate with the peripheral edge of the sliding face S on the inner peripheral side and not to communicate with the peripheral edge on the outer peripheral side.

Further, a degassing groove 18 is provided radially between the fluid introduction grooves 17 and the dynamic pressure generation grooves 11.

The degassing groove 18 includes circumferential groove portions 18a provided radially between the fluid introduction grooves 17 arranged on the outer peripheral side of the sliding face S and the dynamic pressure generation grooves 11 arranged on the inner peripheral side, and radial groove portions 18b provided circumferentially between the fluid introduction grooves 17 and communicating with the outer peripheral side. The depth of the degassing groove 18 is set deeper than the depth of the dynamic pressure generation grooves 11, like the fluid introduction grooves 17.

In this example, six radial groove portions 18b are circumferentially evenly spaced, but the present invention is not limited to this. It is only necessary to provide at least one radial groove portion 18b.

The fluid introduction grooves 17 are provided in portions enclosed by the degassing groove 18 and the outer peripheral side, each have an opening 17a open to the outer peripheral side at an upstream end during rotation, and an end 17b located radially inside at a downstream end, and are formed in a spiral shape.

The dynamic pressure generation grooves 11 are provided in a portion enclosed by the degassing groove 18 and the inner peripheral side, each have an opening 11a open to the inner peripheral side at an upstream end during rotation, and an end 11b located radially inside at a downstream end, and are formed in a spiral shape.

Now, suppose the rotating-side seal ring 4 rotates in a clockwise direction. By providing the spiral fluid introduction grooves 17 configured to communicate with the peripheral edge of the sliding face S on the sealed fluid side, i.e. the outer peripheral side, and not to communicate with the peripheral edge on the leakage side, i.e. the inner peripheral side, dynamic pressure is generated by the suction of liquid present on the outer peripheral side of the sliding face S in a low-speed rotation state of the rotating-side seal ring 4 such as at the time of startup, and the liquid can be actively introduced into the sliding face S to lubricate the sliding face S.

During high-speed rotation of the rotating-side seal ring 4 such as in steady operation, the liquid introduced into the sliding face through the fluid introduction grooves 17 is discharged by centrifugal force, and thus the liquid does not leak to the inner peripheral side, the leakage side.

Further, by providing the dynamic pressure generation grooves 11 configured to communicate with the peripheral edge of the sliding face S on the inner peripheral side and not to communicate with the peripheral edge on the outer peripheral side, in a high-speed rotation state of the rotating-side seal ring 4 such as in steady operation, gas is sucked from the inlets 11a on the inner peripheral side, and dynamic pressure (positive pressure) is generated in the vicinity of the ends 11b on the outer peripheral side, so that a slight gap is formed between the sliding faces S of the rotating-side seal ring 4 and the stationary-side seal ring 7, and the sliding faces S can be brought into a state of gas lubrication and very low friction.

At that time, if the gas (air bubbles) sucked through the spiral dynamic pressure generation grooves 11 enter a liquid lubrication portion, dynamic pressure generation in the liquid becomes unstable. Since the degassing groove 18 is provided, the sucked gas (air bubbles) is discharged to the outer peripheral side without entering the liquid lubrication portion, and dynamic pressure generation in the liquid in the liquid lubrication portion can be stabilized.

Further, since the degassing groove 18 is provided, liquid on the outer peripheral side is prevented from leaking to the inner peripheral side.

Although the embodiments of the present invention have been described above with reference to the drawings, a specific configuration is not limited to these embodiments. Any changes and additions made without departing from the scope of the present invention are included in the present invention.

For example, although the above embodiments have illustrated examples in which a sliding part is used as one of a pair of a rotating seal ring and a stationary seal ring in a mechanical seal device, it can also be used as a bearing sliding part that slides on a rotating shaft while sealing lubricating oil on axially one side of a cylindrical sliding surface.

Further, for example, although the above embodiments have described the outer peripheral side of a sliding part as the sealed fluid side (liquid side or misty fluid side), and the inner peripheral side as the leakage side (gas side), the present invention is not limited to this. The present invention is applicable to a case where the outer peripheral side is the leakage side (gas side), and the inner peripheral side is the sealed fluid side (liquid side or misty fluid side). As for the pressure magnitude relationship between the sealed fluid side (liquid side or misty fluid side) and the leakage side (gas side), for example, the sealed fluid side (liquid side or misty fluid side) may be under a high pressure and the leakage side (gas side) under a low pressure, and vice versa, or both sides may be under the same pressure.

Further, for example, in the above embodiments, the positive pressure generation mechanisms 15 are formed from Rayleigh step mechanisms including the positive pressure generation grooves 15a communicating with the fluid introduction grooves 10 and the Rayleigh steps 15b, but are not limited to this. It is essential only that they be mechanisms generating positive pressure.

REFERENCE SIGN LIST 1 impeller
2 rotating shaft
3 sleeve
4 rotating-side seal ring
5 housing
6 cartridge
7 rotating-side seal ring
8 coiled wave spring
10 fluid introduction groove
10a opening
11 dynamic pressure generation groove
11a inlet on the inner peripheral side
11b end on the outer peripheral side
12 fluid introduction groove
12a opening
12b side opposite
13, 13' dynamic pressure generation groove
13a radial communication portion
13b dynamic pressure generation portion
13c end
15 positive pressure generation mechanism
15a positive pressure generation groove
15b Rayleigh step
16 fluid introduction groove
16a fluid introduction portion
16b fluid discharge portion
16c fluid communication portion
17 fluid introduction groove
17a opening
17b end
18 degassing groove
18a circumferential groove portion
18b radial groove portion
S sliding face
R land

The invention claimed is:

1. A sliding component comprising:
a pair of sliding parts that relatively slide on each other, one of the sliding parts being a stationary-side seal ring, the other of the sliding parts being a rotating-side seal ring, the seal rings each having a sliding face formed radially for sealing sealed fluid from leaking, the sliding faces-comprising:
a fluid introduction groove and a dynamic pressure groove;
wherein the fluid introduction groove and the dynamic pressure generation groove are both provided on and the sliding face of the rotating-side seal ring or both provided on the sliding face of the stationary-side seal ring; or
wherein the fluid introduction groove is on one of either the sliding face of the rotating-side seal ring or the sliding face of the stationary-side seal ring and the dynamic pressure generation groove is provided on the opposing sliding face from the fluid introduction groove,
wherein the fluid introduction groove communicates with a second peripheral edge and not a first peripheral edge of the sliding face on which it is located;
wherein the dynamic pressure groove communicates with a first peripheral edge and not a second peripheral edge of the sliding face on which it is located; and
wherein a positive pressure generation mechanism with a positive pressure generation groove that communicates, at an upstream end, with the fluid introduction groove is provided.

2. The sliding component according to claim 1, wherein the fluid introduction groove and the dynamic pressure generation groove are provided only in the sliding face of the rotating-side seal ring.

3. The sliding component according to claim 1, wherein the fluid introduction groove and the dynamic pressure generation groove are provided only in the sliding face of the stationary-side seal ring.

4. The sliding component according to claim 1, wherein the fluid introduction groove is provided in the sliding face of one of the rotating-side seal ring and the stationary-side seal ring, and the dynamic pressure generation groove is provided in the sliding face of the other of the rotating-side seal ring and the stationary-side seal ring.

5. The sliding component according to claim 1, wherein a degassing groove is provided, on the sliding face of the rotating-side seal ring or the stationary-side seal ring, radially between the fluid introduction groove and the dynamic pressure generation groove.

6. The sliding component according to claim 1, wherein the fluid introduction groove is provided along the first peripheral edge of the sliding face, has an opening that is open only to the first peripheral edge of the sliding face, and is formed in a tapered shape largest at the opening.

7. The sliding component according to claim 1, wherein the fluid introduction groove is provided along the first peripheral edge of the sliding face, has an opening that is open only to the first peripheral edge of the sliding face, and is formed in a shape radially cut in an arc shape at a side opposite to the opening.

8. The sliding component according to claim 1, wherein the fluid introduction groove is provided along the first peripheral edge of the sliding face, and includes a fluid introduction portion and a fluid discharge portion that communicate only with the first peripheral edge of the sliding face, and a fluid communication portion that circumferentially connects the fluid introduction portion and the fluid discharge portion.

9. The sliding component according to claim 1, wherein the dynamic pressure generation groove has a spiral shape that communicates only with the second peripheral edge of the sliding face.

10. The sliding component according to claim 1, wherein the dynamic pressure generation groove comprises a pair of substantially L-shaped grooves arranged symmetrically that communicates only with the second peripheral edge of the sliding face.

11. A sliding component comprising:
a pair of sliding parts that relatively slide on each other, one of the sliding parts being a stationary-side seal ring, the other of the sliding parts being a rotating-side seal ring, the seal rings each having a sliding face formed radially for sealing liquid or misty fluid which is sealed fluid from leaking, the sliding faces comprising:
a fluid introduction groove and a dynamic pressure groove;
wherein the fluid introduction groove and the dynamic pressure generation groove are both provided on the sliding face of the rotating-side seal ring or both provided on the sliding face of the stationary-side seal ring; or
wherein the fluid introduction groove is on one of either the sliding face of the rotating-side seal ring or the sliding face of the stationary-side seal ring and the dynamic pressure generation groove is provided on the opposing sliding face from the fluid introduction groove,
wherein the fluid introduction groove communicates with a peripheral edge of the sliding face on a sealed fluid side and not a peripheral edge of the sliding face on a leakage side on which it is located;
wherein the dynamic pressure groove communicates with a peripheral edge of the sliding face on a leakage side and not a peripheral edge of the sliding face on a sealed fluid side on which it is located; and
wherein a positive pressure generation mechanism with a positive pressure generation groove that communicates, at an upstream end, with the fluid introduction groove is provided.

12. The sliding component according to claim 11, wherein the fluid introduction groove and the dynamic pressure generation groove are provided only in the sliding face of the rotating-side seal ring.

13. The sliding component according to claim 11, wherein the fluid introduction groove and the dynamic pressure generation groove are provided only in the sliding face of the stationary-side seal ring.

14. The sliding component according to claim 11, wherein the fluid introduction groove is provided in the sliding face of one of the rotating-side seal ring and the stationary-side seal ring, and the dynamic pressure generation groove is provided in the sliding face of the other of the rotating-side seal ring and the stationary-side seal ring.

15. The sliding component according to claim 11, wherein a degassing groove is provided, on the sliding face of the rotating-side seal ring or the stationary-side seal ring, radially between the fluid introduction groove and the dynamic pressure generation groove.

16. The sliding component according to claim 11, wherein the fluid introduction groove is provided along the peripheral edge of the sliding face on the sealed fluid side, has an opening that is open only to the peripheral edge of the sliding face on the sealed fluid side, and is formed in a tapered shape largest at the opening.

17. The sliding component according to claim 11, wherein the fluid introduction groove is provided along the peripheral edge of the sliding face on the sealed fluid side, has an opening that is open only to the peripheral edge of the sliding face on the sealed fluid side, and is formed in a shape radially cut in an arc shape at a side opposite to the opening.

18. The sliding component according to claim 11, wherein the fluid introduction groove is provided along the peripheral edge of the sliding face on the sealed fluid side, and includes a fluid introduction portion and a fluid discharge portion that communicate only with the peripheral edge of the sliding face on the sealed fluid side, and a fluid communication portion that circumferentially connects the fluid introduction portion and the fluid discharge portion.

* * * * *

UNITED STATES PATENT AND TRADEMARK OFFICE
CERTIFICATE OF CORRECTION

PATENT NO. : 10,704,417 B2
APPLICATION NO. : 15/565664
DATED : July 7, 2020
INVENTOR(S) : Yuichiro Tokunaga et al.

Page 1 of 1

It is certified that error appears in the above-identified patent and that said Letters Patent is hereby corrected as shown below:

In the Claims

At Column 22, Line 18, in Claim 1, please delete the "-" between "the sliding faces" and "comprising:".

At Column 22, Line 22, in Claim 1, please delete "and" between "provided on" and "the sliding face".

Signed and Sealed this
First Day of September, 2020

Andrei Iancu
*Director of the United States Patent and Trademark Office*